(12) United States Patent
Iizuka

(10) Patent No.: US 11,884,112 B2
(45) Date of Patent: Jan. 30, 2024

(54) TIRE FAILURE PREDICTION SYSTEM AND TIRE FAILURE PREDICTION METHOD

(71) Applicant: The Yokohama Rubber Co., LTD., Tokyo (JP)

(72) Inventor: Hiroshi Iizuka, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 261 days.

(21) Appl. No.: 17/309,963

(22) PCT Filed: Dec. 12, 2019

(86) PCT No.: PCT/JP2019/048646
§ 371 (c)(1),
(2) Date: Jul. 6, 2021

(87) PCT Pub. No.: WO2020/145018
PCT Pub. Date: Jul. 16, 2020

(65) Prior Publication Data
US 2022/0080786 A1    Mar. 17, 2022

(30) Foreign Application Priority Data
Jan. 9, 2019 (JP) ................................ 2019-002167

(51) Int. Cl.
*B60C 23/00* (2006.01)
*B60C 23/04* (2006.01)
*B60C 23/20* (2006.01)

(52) U.S. Cl.
CPC ............ *B60C 23/008* (2013.01); *B60C 23/04* (2013.01); *B60C 23/20* (2013.01)

(58) Field of Classification Search
CPC ....... B60C 23/008; B60C 23/04; B60C 23/20; B60C 23/0474; B60C 23/0477
(Continued)

(56) References Cited

U.S. PATENT DOCUMENTS 5,274,355 A * 12/1993 Galan ................. B60C 23/0423
73/705
6,809,637 B1   10/2004 Brown
(Continued)

FOREIGN PATENT DOCUMENTS

DE   100 40 647 A1   2/2002
DE   699 26 408 T2   5/2006
(Continued)

*Primary Examiner* — Eric Blount
(74) *Attorney, Agent, or Firm* — Thorpe North & Western

(57) ABSTRACT

A tire failure prediction system includes first and second temperature sensors to detect temperatures of first and second tires mounted on a traveling vehicle, a temperature acquisition unit to acquire the temperatures detected by the first and second temperature sensors, and a determination unit to determine, based on the temperatures acquired, a possibility of failure for the first and second tires. The vehicle includes axles on which the tires are mounted. The first and second tires are mounted on an identical axle of the vehicle. Mounting positions of the first and second tires are symmetrical on the identical axle. The determination unit determines that the first tire has a possibility of failure where the temperature of the first tire is greater than a predetermined threshold, and a difference between the temperatures of the first and second tires is greater than a predetermined first temperature threshold.

14 Claims, 24 Drawing Sheets

(58) Field of Classification Search
USPC .................................................. 340/442–447
See application file for complete search history.

(56) References Cited

U.S. PATENT DOCUMENTS

| | | | |
|---|---|---|---|
| 6,988,026 B2 * | 1/2006 | Breed | ................... B60R 21/232 |
| | | | 701/33.9 |
| 2002/0095980 A1 | 7/2002 | Breed | |
| 2003/0070477 A1 | 4/2003 | Fisher et al. | |
| 2016/0159173 A1 | 6/2016 | Schneider | |

FOREIGN PATENT DOCUMENTS

| | | |
|---|---|---|
| DE | 10 2006 005 143 A1 | 8/2007 |
| DE | 10 2013 220 715 A1 | 4/2015 |
| DE | 101 44 328 B4 | 10/2015 |
| DE | 10 2015 001 803 A1 | 8/2016 |
| JP | 3-262715 A | 11/1991 |
| JP | H06-211012 A | 8/1994 |
| JP | 2002-103931 A | 4/2002 |
| JP | 2004-58968 A | 2/2004 |
| JP | 2007-50735 A | 3/2007 |
| WO | WO 01/17806 A1 | 3/2001 |

* cited by examiner

TIRE FAILURE PREDICTION SYSTEM AND TIRE FAILURE PREDICTION METHOD

TECHNICAL FIELD

The present technology relates to a tire failure prediction system and a tire failure prediction method.

BACKGROUND ART

An accident may occur in a case where any of tires mounted on a traveling vehicle fails. In order to prevent a possible accident, it is necessary to predict failure in a tire and output a warning to a driver or the like of the vehicle.

For prediction of tire failure, a technology is known in which the temperature and air pressure of a tire are detected and in which based on detection results, a possible tire burst is predicted (for example, Japan Unexamined Patent Publication No. 6-211012). In addition, a technology is known that involves comparing a difference in data between a plurality of tires and a difference in the change rate of the data, arithmetically comparing the differences with specified values, and in a case where an abnormality is found, transmitting abnormality information (for example, Japan Unexamined Patent Publication No. 2002-103931).

The technology described above has room for improvement in predicting failure of tires mounted on a traveling vehicle.

SUMMARY

The present technology provides a tire failure prediction system and a tire failure prediction method that can perform abnormality determination with high accuracy to predict failure.

A tire failure prediction system according to an aspect of the present technology includes first and second temperature sensors configured to detect a temperature value of each of a first tire and a second tire that are mounted on a traveling vehicle, a temperature acquisition unit configured to acquire the temperature values respectively detected by the first and second temperature sensors, and a determination unit configured to make a determination, based on the temperature values acquired by the temperature acquisition unit, of a possibility of failure of the first and second tires, the vehicle including axles on which the tires are mounted, the first tire and the second tire being mounted on an identical axle of the vehicle, a mounting position of the first tire and a mounting position of the second tire being symmetrical positions on the identical axle, and the determination unit making a determination that the first tire has a possibility of failure in a case where the temperature value of the first tire acquired by the temperature acquisition unit is greater than a predetermined threshold value and a temperature difference corresponding to a difference between the temperature value of the first tire and the temperature value of the second tire acquired by the temperature acquisition unit is greater than a predetermined first temperature threshold value.

Additionally, the tire failure prediction system may further include first and second air pressure sensors configured to detect air pressure values of inner portions of the first tire and the second tire, the first tire and the second tire being pneumatic tires, and an air pressure acquisition unit acquiring the air pressure values respectively detected by the first and second air pressure sensors, in which the determination unit may make the determination by using a second temperature difference threshold value that is higher than the first temperature difference threshold value in a case where an air pressure difference corresponding to a difference between the air pressure value of the first tire and the air pressure value of the second tire acquired by the air pressure acquisition unit is greater than a predetermined threshold value.

The air pressure value of the first tire may be a first temperature-converted air pressure value acquired by converting a detection value of the first air pressure sensor based on a predetermined temperature, and the air pressure value of the second tire may be a second temperature-converted air pressure value acquired by converting a detection value of the second air pressure sensor based on a predetermined temperature, and the determination unit may make the determination by using a second temperature difference threshold value that is higher than the first temperature difference threshold value in a case where an air pressure difference corresponding to a difference between the first temperature-converted air pressure value and the second temperature-converted air pressure value is greater than a predetermined threshold value.

The determination unit may determine that the first tire has a possibility of failure in a case where a temperature difference corresponding to a difference between the temperature value of the first tire and the temperature value of the second tire acquired by the temperature acquisition unit is greater than the second temperature difference threshold value, and the determination unit may not determine that the first tire has a possibility of failure in a case where the temperature difference is not greater than the second temperature difference threshold value.

The tire failure prediction system may further include a temperature difference average value calculating unit configured to calculate a temperature difference average value between the temperature value detected by the first temperature sensor and the temperature value detected by the second temperature sensor, in which the determination unit may further determine that the first tire has a possibility of failure in a case where an absolute value of a difference between the temperature difference average value and the temperature difference is greater than a predetermined third temperature difference threshold value, and the determination unit may not determine that the first tire has a possibility of failure in a case where the absolute value of the difference between the temperature difference average value and the temperature difference is not greater than the third temperature difference threshold value.

The tire failure prediction system may further include an ambient temperature sensor configured to detect an ambient temperature of an external portion of the vehicle and a temperature correction unit configured to detect a temperature value acquired by the temperature acquisition unit based on the ambient temperature detected by the ambient temperature sensor, and the determination unit may make the determination based on a temperature value corrected by the temperature correction unit.

The tire failure prediction system may further include a temperature change rate calculating unit configured to calculate a temperature change rate of the temperature value detected by the first temperature sensor and a temperature change rate of the temperature value detected by the second temperature sensor, and the determination unit may further make the determination in a case where the temperature change rate of the temperature value detected by the first temperature sensor is greater than a predetermined change rate threshold value, and a ratio between the temperature change rate of the temperature value detected by the first temperature sensor and the temperature change rate of the temperature value detected by the second temperature sensor is greater than a predetermined change rate ratio threshold value.

The tire failure prediction system may further include a temperature change rate ratio average value calculating unit configured to calculate an average value of a temperature change rate ratio corresponding to the ratio between the temperature change rate of the temperature value detected by the first temperature sensor and the temperature change rate of the temperature value detected by the second temperature sensor, and the determination unit may further determine that the first tire has a possibility of failure in a case where a value of the temperature change rate ratio with respect to the average value calculated by the average value calculating unit is greater than a predetermined threshold value.

The tire failure prediction system may further include a normal-time temperature difference calculating unit configured to calculate a temperature difference between the first tire and the second tire during normal time, and the determination unit may further determine that the first tire has a possibility of failure in a case where a difference between a temperature difference between the first tire and the second tire and the temperature difference during normal time is greater than a predetermined threshold value.

The tire failure prediction system may further include a normal-time temperature change rate calculating unit configured to calculate a temperature change rate ratio between the first tire and the second tire during normal time, and the determination unit may further determine that the first tire has a possibility of failure in a case where the value of the temperature change rate ratio during normal time with respect to a maximum value of the temperature change rate ratio during normal time is greater than a predetermined threshold value.

The temperature acquisition unit may acquire the temperature value at a predetermined period length, and the temperature acquisition unit may acquire the temperature value of the first tire at a period length smaller than the predetermined period length in a case where the temperature value of the first tire acquired by the temperature acquisition unit is greater than a predetermined threshold value, and a difference between the temperature of the first tire and the temperature of the second tire is greater than a predetermined threshold value.

The tire failure prediction system may further include a warning unit configured to output a warning related to a tire based on a determination result from the determination unit.

In order to solve the problems described above and achieve the object described above, a tire failure prediction method according to an aspect of the present technology includes the steps of acquiring temperature values of a first tire and a second tire mounted at symmetrical positions on an identical axle of a traveling vehicle, the temperature values being respectively detected by first and second temperature sensors, and determining that the first tire has a possibility of failure in a case where the temperature value of the first tire is greater than a predetermined threshold value, and a temperature difference corresponding to a difference between the temperature value of the first tire and the temperature value of the second tire is greater than a predetermined first temperature threshold value.

According to the tire failure prediction system and the tire failure prediction method of the present technology, an abnormality can be determined with higher accuracy and failure can be predicted.

DETAILED DESCRIPTION

Embodiments of the present technology are described in detail below with reference to the drawings. In the embodiments described below, identical or substantially similar components to those of other embodiments have identical reference signs, and descriptions of those components are either simplified or omitted. The present technology is not limited by the embodiments. Constituents of the embodiments include elements that are essentially identical or that can be substituted or easily conceived by one skilled in the art. Furthermore, the plurality of modified examples described in the embodiment can be combined as desired within the scope apparent to one skilled in the art.

First Embodiment

A tire failure prediction system according to a first embodiment will now be described.

Configuration

Figure 1:
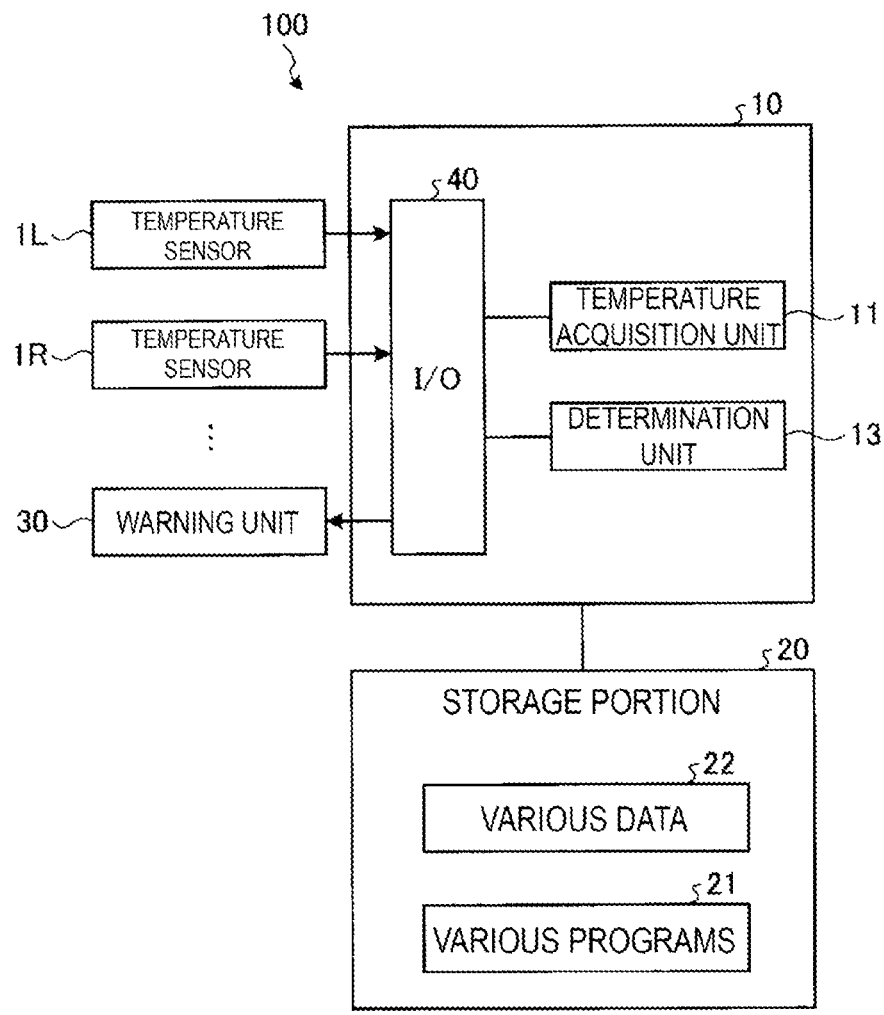
FIG. 1 is a block diagram illustrating a configuration of a tire failure prediction system according to a first embodiment.

FIG. 1 is a block diagram illustrating a configuration of a tire failure prediction system 100 according to the first embodiment. In FIG. 1, the tire failure prediction system 100 includes a control unit 10, a storage unit 20, and a warning unit 30. The control unit 10 is a device that comprehensively controls the operation of the tire failure prediction system 100, and includes, for example, a central processing unit (CPU), a read-only memory (ROM), a random-access memory (RAM), and the like. The control unit 10 includes a temperature acquisition unit 11, a determination unit 13, and an input/output unit (I/O) 40. Specifically, the functions of the temperature acquisition unit 11, the determination unit 13, and the input/output unit 40 are realized by the CPU of the control unit 10 loading and executing programs in the storage unit 20.

The temperature acquisition unit 11 acquires temperature data from temperature sensors 1L and 1R. The temperature acquisition unit 11 acquires temperature data at a predetermined period length. The temperature data acquired by the temperature acquisition unit 11 is stored in the storage unit 20. The input/output unit (I/O) 40 functions as an input unit that receives data from the temperature sensors 1L, 1R, and the like. Additionally, the input/output unit (I/O) 40 functions as an output unit that outputs data based on a determination result from the determination unit 13.

The storage unit 20 is a device for storing various types of programs 21 and various types of data 22 used for processing in the control unit 10. The storage unit 20 includes, for example, a non-volatile memory or a magnetic storage device. The storage unit 20 may be provided inside the control unit 10, and the control unit 10 and the storage unit 20 may be integrated with each other. The various programs 21 include programs for making determinations described below. The various data 22 includes threshold values for making the determinations described below.

The warning unit 30 is a device for outputting a warning. The warning unit 30 outputs a warning based on a warning signal output from the control unit 10. The control unit 10 outputs the warning signal in a case where it is determined that the any of the tires of the subject vehicle has a possibility of failure. The warning unit 30, for example, outputs the warning to a driver of the vehicle. The warning is provided by, for example, a voice output or a display output. Additionally, the warning unit 30 may output a warning to an external device. The warning unit 30 may output a warning to the driver of the vehicle and output a warning to the external device.

For a tire mounted on the vehicle, the tire failure prediction system 100 references data regarding the temperature of another tire mounted on the same axle at a symmetrical position to determine whether the tire has an abnormality.

For example, in a case where it is determined whether a first tire has an abnormality or not, determination is made with reference to data regarding the temperature of a second tire mounted on the same axle at a symmetrical position.

Figure 2:
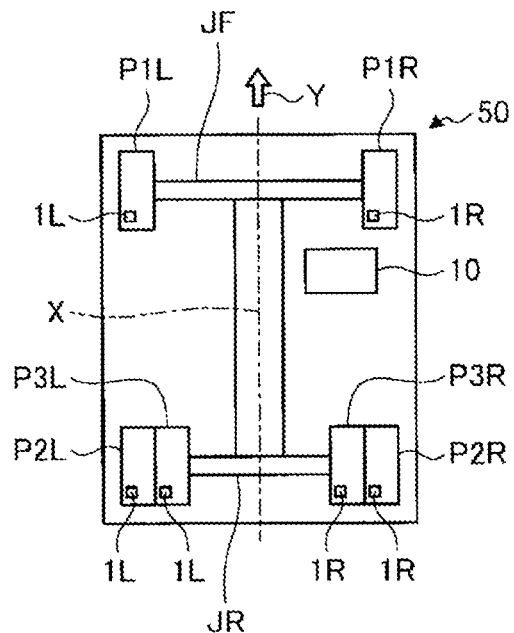
FIG. 2 is a diagram illustrating an example of positions where temperature sensors are provided.

FIG. 2 is a diagram illustrating an example of positions where the temperature sensors 1L and 1R are provided. In the present example, the vehicle 50 includes two front wheels on one axle and four rear wheels on one axle. The advancement direction of the vehicle 50 corresponds to the direction of arrow Y. On an axle JF for the front wheels, a tire P1L is mounted on a left side in the advancement direction and a tire P1R is mounted on a right side in the advancement direction. On an axle JR for the rear wheels, a tire P2L is mounted on a left outer side in the advancement direction and a tire P2R is mounted on a right outer side in the advancement direction. Additionally, on the axle JR for the rear wheels, a tire P3L is mounted on a left inner side in the advancement direction and a tire P3R is mounted on a right inner side in the advancement direction. The two left tires and the two right tires mounted on the rear wheels constitute double tires. The double tires have a configuration in which two tires are mounted on a vehicle outer side and a vehicle inner side of one wheel. Note that the tires mounted on the vehicle may be collectively referred to as the tires P.

In the present embodiment, a difference in temperature between tires mounted at symmetrical positions on the vehicle, and the like, are to be processed. "Mounted at symmetrical positions" refers to the first tire and the second tire being mounted on the same axis at left-right symmetrical positions with respect to an imaginary line X from the front side (advancement direction) toward the rear side (reverse direction).

In a vehicle including two front wheels on one axle, a first tire (for example, the left tire P1L) mounted on the axle JF for the front wheels and a second tire (for example, the right tire P1R) mounted on the same axle JF for the front wheels are mounted at symmetrical positions.

In a vehicle including four rear wheels on one axle, a first tire mounted on the outer side of the axle JR for the rear wheels (for example, the left outer tire P2L) and a second tire (for example, the right outer tire P2R) mounted on the outer side of the same axle JR of the rear wheels are mounted at symmetrical positions. Additionally, a first tire (for example, the left inner tire P3L) mounted on the inner side of the axle JR for the rear wheels and a second tire (for example, the right inner tire P3R) mounted on the inner side of the same axle for the rear wheels are mounted at symmetrical positions.

In the present example, the temperature sensors 1L and 1R are provided inside each of the tires P. The control unit 10 wirelessly acquires data of the temperature sensors 1L and 1R. The control unit 10 may acquire data directly from each sensor, or, with a relay provided, the control unit 10 may acquire data from each sensor via the relay. Note that in FIG. 2, illustration of the storage unit 20 is omitted.

Figure 3:
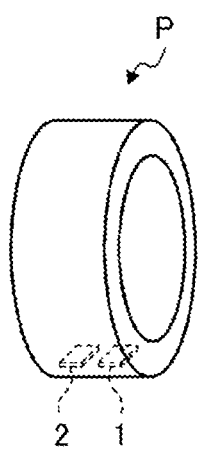
FIG. 3 is a diagram illustrating an example of an arrangement of the sensors in the tire.

FIG. 3 is a diagram illustrating an example of the arrangement of the sensors in the tire P. As illustrated in FIG. 3, the temperature sensor 1 (1L, 1R) is provided in the interior or cavity of the tire P. In the present example, the temperature sensor 1 (1L, 1R) is preferably installed inside a tread portion of the tire P. Note that, like the temperature sensor 1, an air pressure sensor 2 described below is preferably provided in the inner portion or cavity of the tire P.

Figure 4:
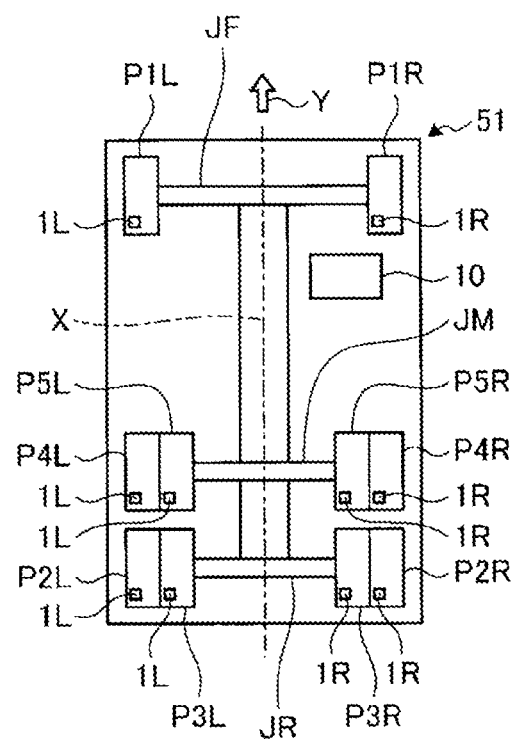
FIG. 4 is a diagram illustrating another example of positions where the temperature sensors are provided.

FIG. 4 is a diagram illustrating another example of positions where the temperature sensors 1L and 1R are provided. In the present example, a vehicle 51 includes two front wheels on one axle and eight rear wheels on two axles. The advancement direction of the vehicle 51 corresponds to the direction of arrow Y. On the axle JF for the front wheels, the tire P1L is mounted on the left side in the advancement direction and the tire P1R is mounted on the right side in the advancement direction. On the rear-side axle JR for the rear wheels, the tire P2L is mounted on the left outer side in the advancement direction, and the tire P2R is mounted on the right outer side in the advancement direction. Additionally, on the rear-side axle JR for the rear wheels, the tire P3L is mounted on the rear inner side in the advancement direction, and the tire P3R is mounted on the right inner side in the advancement direction. On a front-side axle JM for the rear wheels, a tire P4L is mounted on the left outer side in the advancement direction, and a tire P4R is mounted on the right outer side in the advancement direction. Additionally, on the front-side axle JM for the rear wheels, a tire P5L is mounted on the left inner side in the advancement direction, and a tire P5R is mounted on the right inner side in the advancement direction. The two left tires on each of the front and rear-sets of the rear wheels and the two right tires on each of the front and rear-sets of the rear wheels constitute double tires. The double tires have a configuration in which two tires are mounted on a vehicle outer side and a vehicle inner side of one wheel. Thus, in the case of a double tire, two tires are mounted on the same wheel.

In FIG. 4, a first tire (for example, the left tire P1L) mounted on the axle JF for the front wheels, and a second tire (for example, the right tire P1R) mounted on the same axle JF for the front wheels are mounted at symmetrical positions.

A first tire (for example, the left outer tire P2L) mounted on the outer side of rear-side axle JR for the rear wheels and a second tire (for example, the right outer tire P2R) mounted on the outer side of the same rear-side axle JR for the rear wheels are mounted at symmetrical positions. Additionally, a first tire (for example, the left inner tire P3L) mounted on the inner side of rear-side axle JR for the rear wheels and a second tire (for example, the right inner tire P3R) mounted on the inner side of the same rear-side axle JR for the rear wheels are mounted at symmetrical positions.

A first tire (for example, a left outer tire P4L) mounted on the outer side of the front-side axle JM for the rear wheels and a second tire (for example, a right outer tire P4R) mounted on the outer side of the same front-side axle JM for the rear wheels are mounted at symmetrical positions. Additionally, a first tire (for example, a left inner tire P5L) mounted on the inner side of the front-side axle JM for the rear wheels, and a second tire (for example, a right inner tire P5R) mounted on the inner side of the front-side axle JM for the rear wheels are mounted at symmetrical positions.

As illustrated in FIG. 4, also for a vehicle including two front wheels on one axle and eight rear wheels on two axles, data of the first tire and data of the second tire mounted on the same axle at left-right symmetrical positions are processed.

In the present example, the temperature sensors 1L and 1R are provided inside the tires. The control unit 10 wirelessly acquires data of the temperature sensors 1L and 1R. The control unit 10 may acquire data directly from each sensor, or, with a relay provided, the control unit 10 may acquire data from each sensor via the relay. Note that in FIG. 4, illustration of the storage unit 20 is omitted.

For other vehicles with different wheel arrangements as well, a temperature sensor is provided in each of the tires P, and whether the tire P has an abnormality is determined by referring to the data regarding the temperature of another tire mounted at a symmetrical position on the same axle.

In the present embodiment, data regarding the temperature T is acquired at a predetermined period length from the temperature sensors 1L, 1R mounted in the tires P in the traveling vehicle. Then, a temperature difference TS between the first tire and the second tire mounted at symmetrical positions on the same axle is calculated. The temperature difference for each set of symmetrical positions is calculated by Equation (F0).

$$TSx = T(PxL) - T(PxR) \quad (F0)$$

In Equation (F0), x=1, 2, 3, . . . . In Equation (F0), T(PxL) is the temperature of a tire mounted on the left side of the vehicle, and T(PxR) is the temperature of a tire mounted on the right side of the vehicle.

In the present embodiment, in a case where conditions (1) and (2) described below are satisfied, a tire is determined to have an abnormality and a warning is output.

Condition (1): the temperature of any of the tires is higher than a preset threshold value Tr1. In other words, $T(Pxy) > Tr1$ . . . (F1). In Equation (F1), x=1, 2, 3, . . . , and y is L (vehicle left side) or R (vehicle right side). In Equation (F1), the threshold value Tr1 is preferably 50° C. or higher and 80° C. or lower.

Condition (2): for a tire (first tire) in which the threshold value is exceeded in condition (1), the temperature difference TS from the tire at a symmetrical position (the second tire) is greater than a predetermined threshold value Tr2. In other words, $|TSx| > Tr2$ . . . (F2). In Equation (F2), x=1, 2, 3, . . . . In Equation (F2), the threshold value Tr2 is preferably 3° C. or higher and 5° C. or lower.

Operation Example

Figure 5:
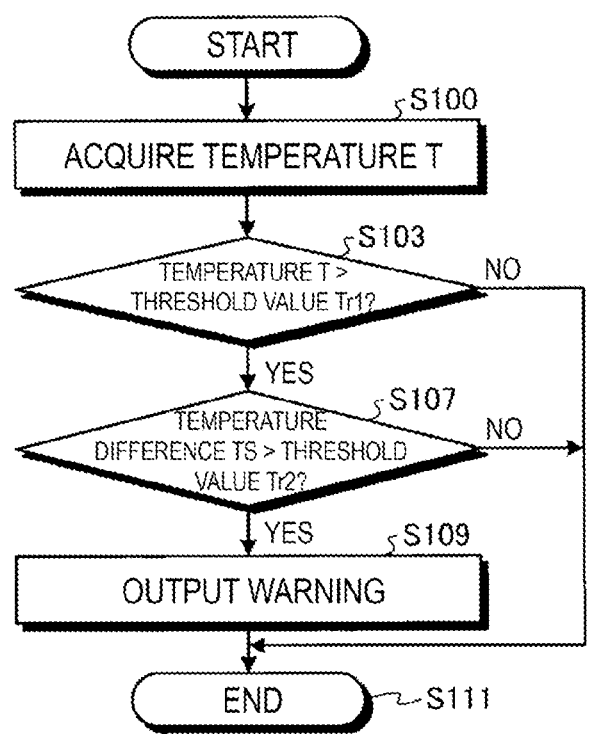
FIG. 5 is a flowchart illustrating an operation example of the tire failure prediction system according to the first embodiment.

FIG. 5 is a flowchart illustrating an example of a tire failure prediction system 100 according to the first embodiment. In FIG. 5, for example, in a case where a vehicle power generation device (not illustrated) is started, the tire failure prediction system 100 performs the following processing. The power generation device is, for example, an engine or an electric motor. For example, when it is detected that an ignition switch of the vehicle has been turned on, it may be determined that the power generation device has started.

The tire failure prediction system 100 according to the first embodiment performs processing for each of the tires mounted on the vehicle in accordance with the flowchart illustrated in FIG. 5. The tire failure prediction system 100 periodically performs processing in accordance with the flowchart illustrated in FIG. 5.

In step S100, the tire failure prediction system 100 acquires data via the temperature sensors 1L, 1R. Then, in step S103, the determination unit 13 of the tire failure prediction system 100 determines whether the temperature T for each data acquired is greater than the predetermined threshold value Tr1 (step S103).

In step S103, in a case where it is determined that the temperature T is greater than the predetermined threshold value Tr1 (Yes in step S103), the determination unit 13 proceeds to processing in step S107.

In step S107, the determination unit 13 determines whether the temperature difference TS between the data from the temperature sensor 1L and the data from the temperature sensor 1R is greater than the predetermined threshold value Tr2 (step S107).

In step S107, in a case where the determination unit 13 determines that the temperature difference TS is greater than the threshold value Tr2 (Yes in step S107), the warning unit 30 outputs a warning (step S109), and the tire failure prediction system 100 terminates the processing (step S111). Subsequently, the tire failure prediction system 100 processes data regarding the other tires mounted on the vehicle.

Note that in step S103 described above, in a case where the determination unit 13 determines that the temperature T is not greater than the predetermined threshold value Tr1 (No in step S103), the tire failure prediction system 100 terminates the processing (step S111). In this case, the tire failure prediction system 100 does not output a warning. Subsequently, the tire failure prediction system 100 processes data regarding the other tires mounted on the vehicle.

Additionally, in step S107 described above, in a case where the determination unit 13 determines that the temperature difference TS is not greater than the predetermined threshold value Tr2 (No in step S107), the tire failure prediction system 100 terminates the processing (step S111). In this case, the tire failure prediction system 100 does not output a warning. Subsequently, the tire failure prediction system 100 processes data regarding the other tires mounted on the vehicle.

More accurate abnormality determination can be achieved by sequentially executing the above-described processing on each of the tires mounted on the vehicle, and comparing abnormal temperatures for combinations of various tires and vehicles, at appropriate mounting positions in the same vehicle.

Example of Variation in Tire Temperature

Figure 6:
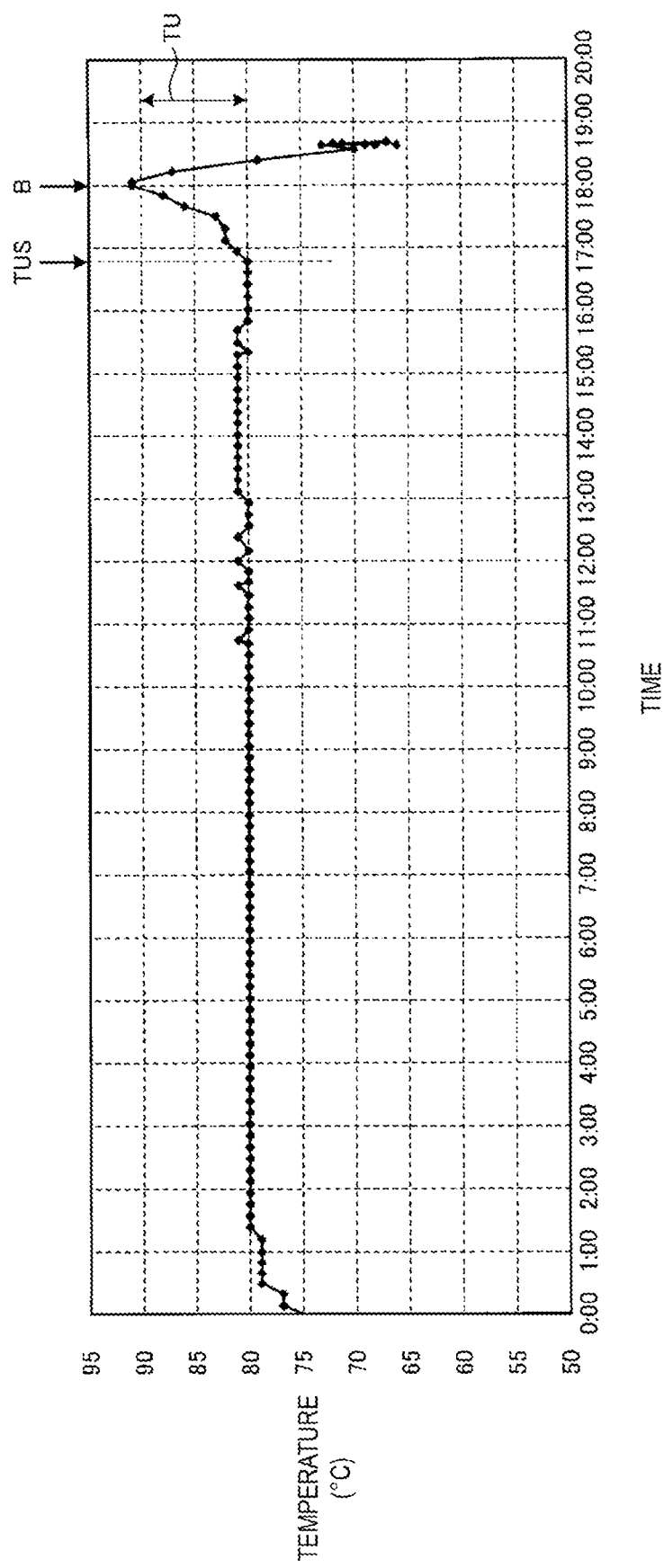
FIG. 6 is a diagram illustrating an example of a change in temperature of a tire mounted on a traveling vehicle.

FIG. 6 is a diagram illustrating an example of a change in the temperature of a certain tire mounted on a traveling vehicle. In FIG. 6, at the start time of traveling of the vehicle (0:00), the temperature inside the air chamber of the tire is 75° C. After the time (10:00) the vehicle has started traveling, the temperature changes slightly. Subsequently, the temperature starts to rise from slightly before the time (17:00), and a burst B occurs in the tire at the time (18:00). At the time of occurrence of the burst B, the temperature in the air chamber of the tire increases. A temperature increase TU is about 10° C. In the present example, the time approximately 1 hour before the occurrence of burst B is a temperature increase start time TUS. Thus, in a case where an increase in temperature or the like is detected after the temperature increase start time TUS and before the occurrence of the burst B, the burst B, that is, tire failure can be predicted.

Figure 7:
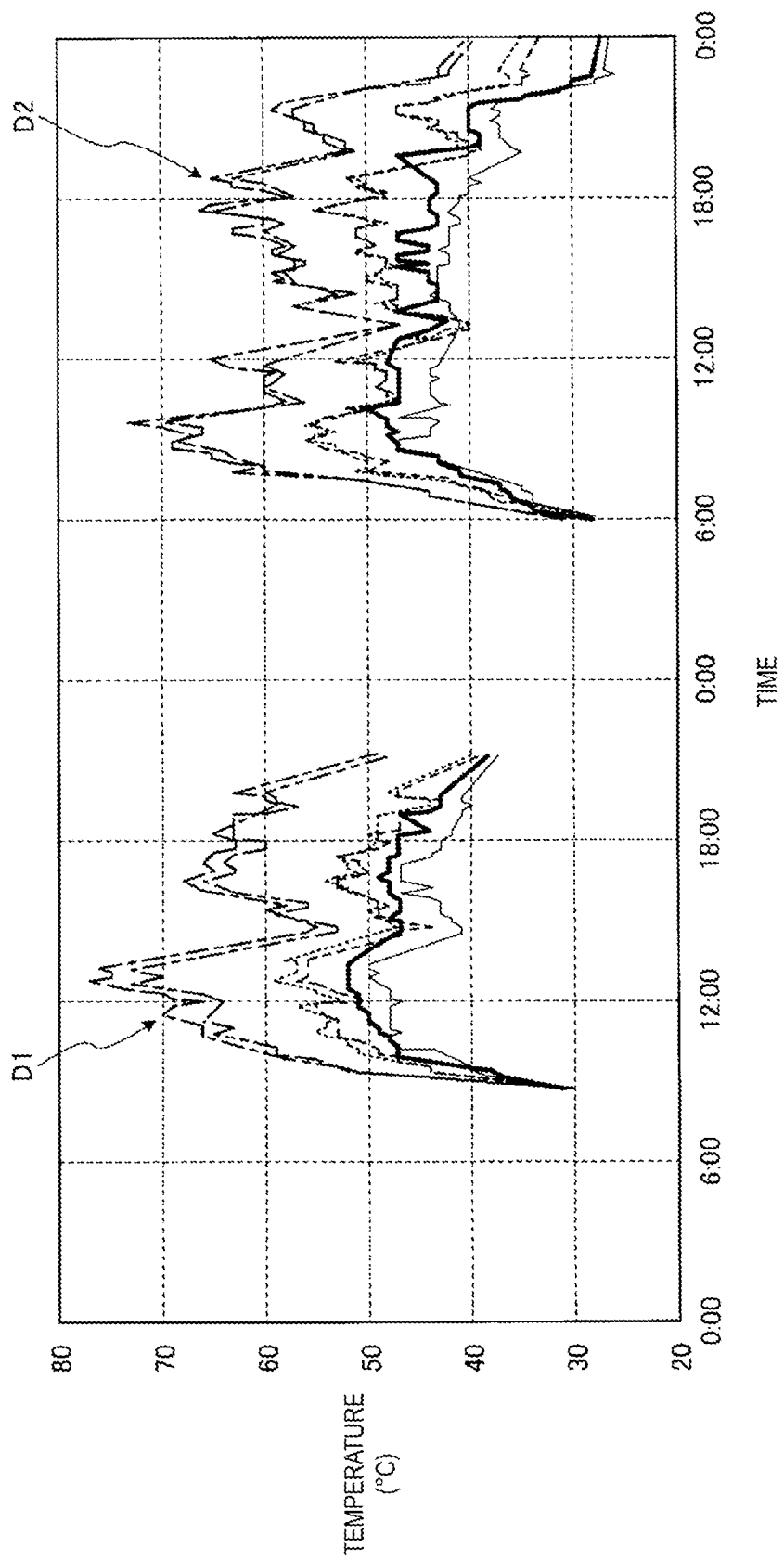
FIG. 7 is a diagram illustrating an example of changes in the internal temperatures of tires mounted on a vehicle.

FIG. 7 is a diagram illustrating an example of changes in the temperature inside each of the tires mounted on the vehicle. FIG. 7 illustrates, for a vehicle including two tires mounted on the front wheels (one on each of the left and right sides), and four tires mounted on the rear wheels (two on each of the left and right sides), an example of changes in the temperature inside each of the tires.

In FIG. 7, a dot-dash line and a double-dot-dash line illustrate examples of changes in temperature inside the tires mounted on the front wheels (tires mounted at symmetrical positions on the same axle). In FIG. 7, the short and long dashed lines illustrate examples of changes in temperature inside the tires mounted on the rear wheels on the vehicle inner side (tires mounted at symmetrical positions on the same axle). In FIG. 7, a thick solid line and a thin solid line illustrate examples of changes in temperature inside the tires mounted on the rear wheels on the vehicle outer side (tires mounted at symmetrical positions on the same axle).

In FIG. 7, a change example D1 and a change example D2 illustrate examples of changes in temperature during the time from the start until end of traveling of the vehicle (hereinafter referred to as a traveling operation), that is, one cycle. The change example D1 illustrates changes in the temperature inside the tire in a case where the vehicle travels from about 8:00 until about 21:00. The change example D2 illustrates changes in the temperature inside the tire in a case where the vehicle travels from about 6:00 until about 0:00.

As can be understood by referring to the change examples D1 and D2 in FIG. 7, the first tire and the second tire mounted at symmetrical positions on the same axle have similar tendencies of temperature changes in spite of a difference in travel time or travel distance. Thus, comparing the temperature values of the tires mounted at symmetrical positions on the same axle, the burst B, that is, tire failure, can be accurately predicted. Note that in the example illustrated in FIG. 7, at the time when the vehicle starts traveling, the first tire and the second tire mounted at symmetrical positions on the same axle are at the same temperature but may be at different temperatures.

As described above, according to the tire failure prediction system of the first embodiment, more accurate abnormality determination can be achieved by making determination by referring to the temperatures of tires mounted at symmetrical positions on the same axle.

Second Embodiment

A tire failure prediction system according to a second embodiment will now be described.

Configuration

Figure 8:
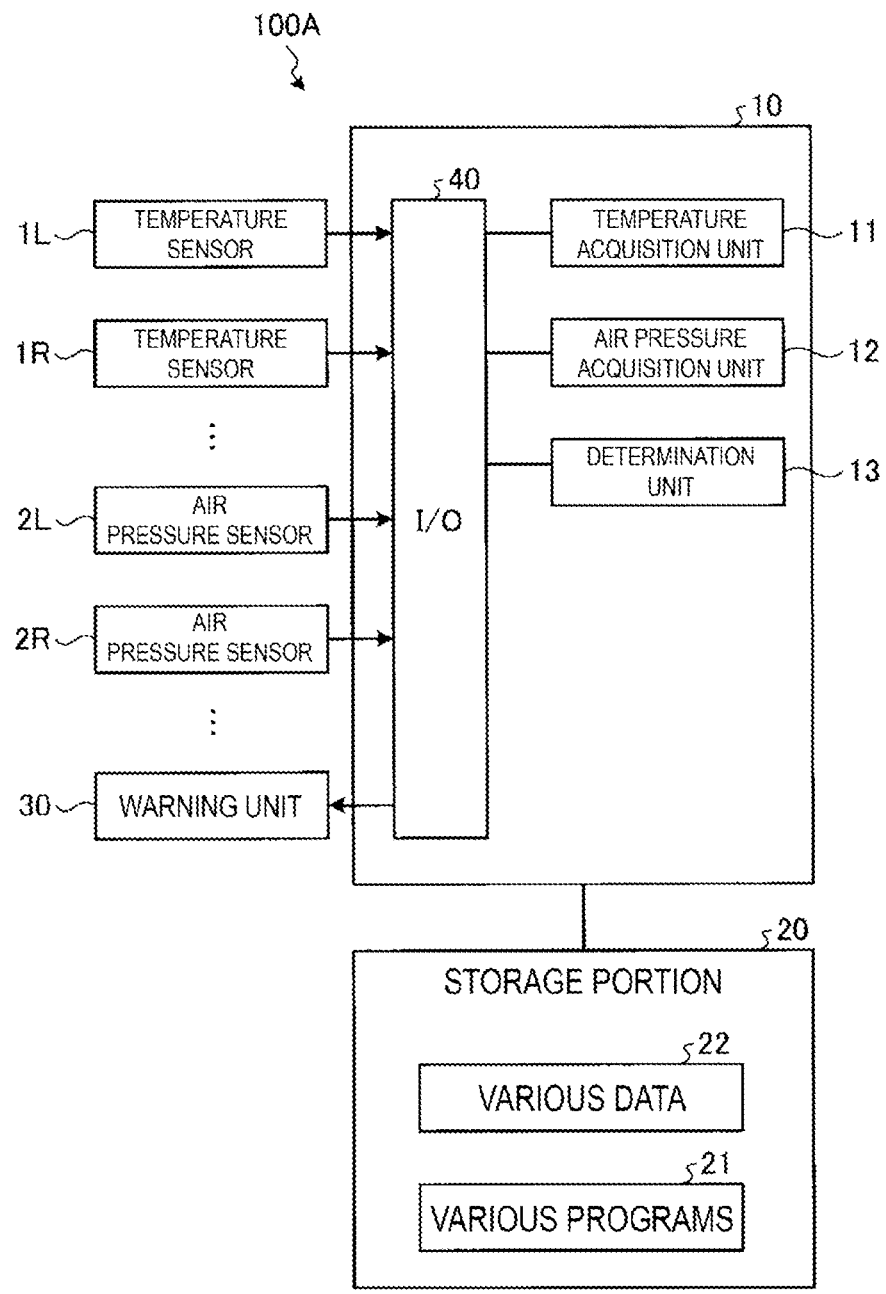
FIG. 8 is a block diagram illustrating a configuration of a tire failure prediction system according to a second embodiment.

FIG. 8 is a block diagram illustrating a configuration of a tire failure prediction system 100A according to a second embodiment. In FIG. 8, the tire failure prediction system 100A corresponds to the tire failure prediction system 100 according to the first embodiment described above additionally including air pressure sensors 2L and 2R and an air pressure acquisition unit 12 added to the control unit 10. The function of the air pressure acquisition unit 12 is realized by the CPU of the control unit 10 loading and executing a program in the storage unit 20. Note that the storage unit 20 may be provided inside the control unit 10, and the control unit 10 and the storage unit 20 may be integrated with each other.

The air pressure acquisition unit 12 acquires air pressure data from the air pressure sensors 2L and 2R. The air pressure acquisition unit 12 acquires air pressure data at a predetermined period length. The air pressure data acquired by the air pressure acquisition unit 12 is stored in the storage unit 20. The input/output unit (I/O) 40 functions as an input unit that inputs data of the air pressure sensors 2L, 2R, and the like.

Figure 9:
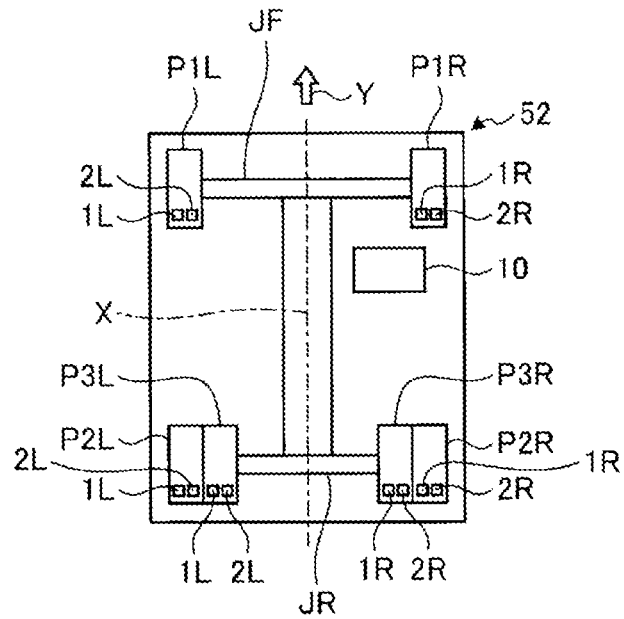
FIG. 9 is a diagram illustrating an example of positions where air pressure sensors are provided.

FIG. 9 is a diagram illustrating an example of the positions where air pressure sensors 2 (2L, 2R) are provided. In the present example, the vehicle 52 includes two front wheels on one axle and four rear wheels on one axle. In the present example, like the temperature sensor 1L, the air pressure sensor 2L is provided inside each of the tires. In the present example, like the temperature sensor 1R, the air pressure sensor 2R is provided inside each of the tires. The control unit 10 wirelessly acquires data from the temperature sensors 1L and 1R and the air pressure sensors 2L and 2R. The control unit 10 may acquire data directly from each sensor, or, with a relay provided, the control unit 10 may acquire data from each sensor via the relay. Note that in FIG. 9, illustration of the storage unit 20 is omitted.

Figure 10:
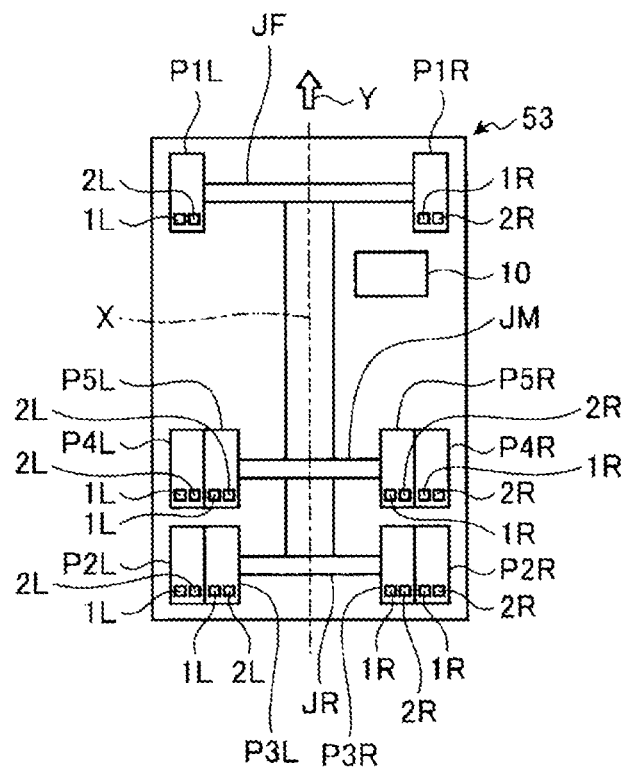
FIG. 10 is a diagram illustrating another example of positions where air pressure sensors are provided.

FIG. 10 is a diagram illustrating another example of positions where the air pressure sensors 2L and 2R are provided. In the present example, a vehicle 53 includes two front wheels on one axle and eight rear wheels on two axles. In the present example, like the temperature sensor 1L, the air pressure sensor 2L is provided inside each of the tires. In the present example, like the temperature sensor 1R, the air pressure sensor 2R is provided inside each of the tires. The control unit 10 wirelessly acquires data from the temperature sensors 1L and 1R and the air pressure sensors 2L and 2R. The control unit 10 may acquire data directly from each sensor, or, with a relay provided, the control unit 10 may acquire data from each sensor via the relay. Note that in FIG. 10, illustration of the storage unit 20 is omitted.

In the present embodiment, the temperature sensor is provided in each of the tires to acquire the temperature of the tire, and the air pressure sensor is provided in each of the tires to acquire the air pressure of the tire. Then, it is determined whether the temperature acquired is greater than the threshold value Tr1 for temperature determination, and in a case where the temperature acquired is greater than the threshold value Tr1, further, it is determined whether the air pressure acquired is greater than a threshold value Ar for abnormality determination for the air pressure. In a case where the air pressure acquired is not greater than the threshold value Ar, the threshold value Tr2 is used to determine the temperature difference between tires at symmetrical positions on the same axle. In a case where the air pressure is abnormal and is greater than the threshold value Ar, a higher threshold value Tr2' is used to determine the temperature difference between tires at symmetrical positions on the same axle.

Operation Example

Figure 11:
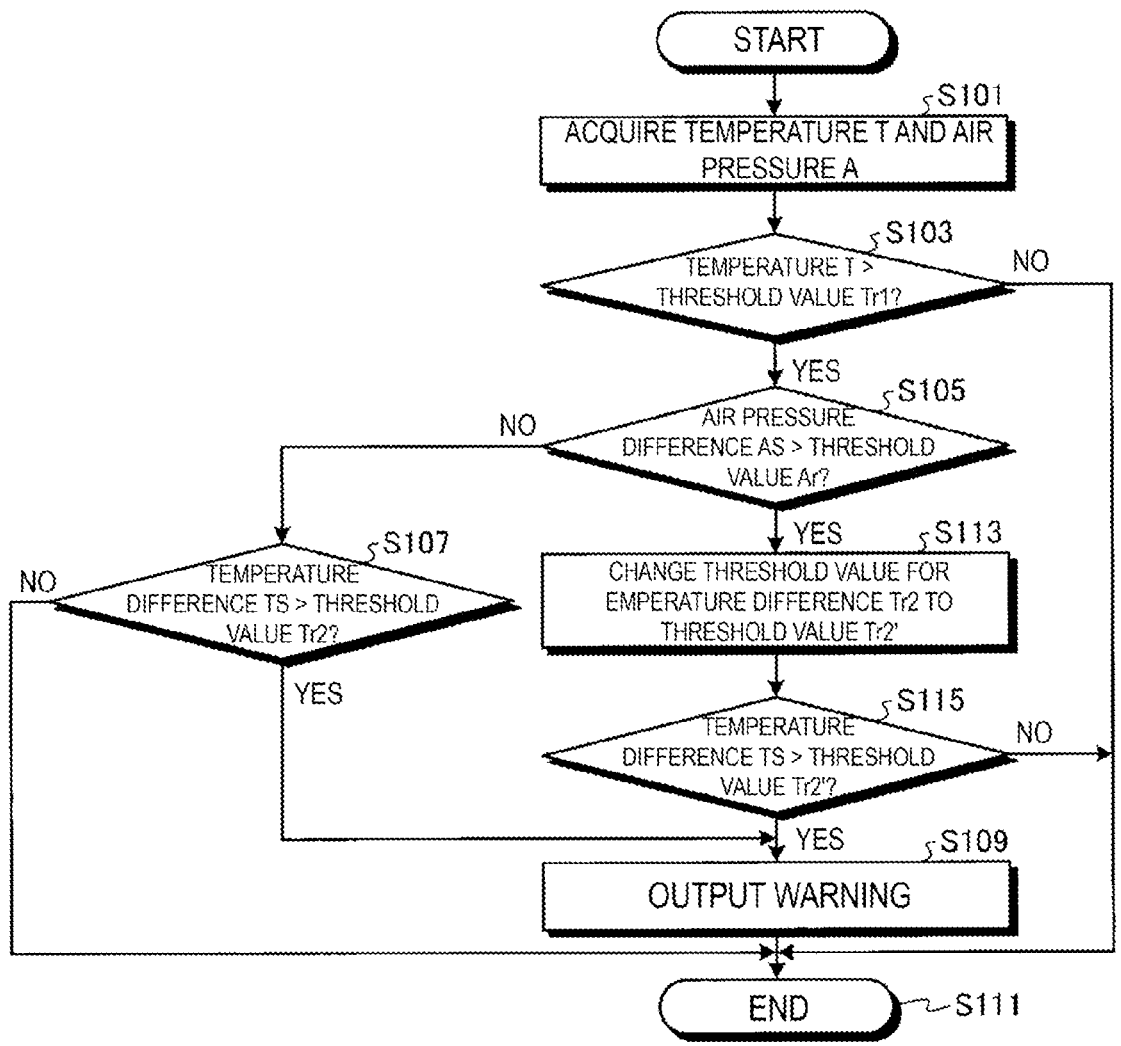
FIG. 11 is a flowchart illustrating an operation example of the tire failure prediction system according to the second embodiment.

FIG. 11 is a flowchart illustrating an operation example of the tire failure prediction system 100A according to the second embodiment. The tire failure prediction system 100A according to the second embodiment performs processing on each of the tires mounted on the vehicle in accordance with the flowchart illustrated in FIG. 11. The tire failure prediction system 100A periodically performs processing in accordance with the flowchart illustrated in FIG. 11.

The tire failure prediction system 100A acquires data using the temperature sensors 1L, 1R and the air pressure sensors 2L, 2R (step S101). Then, the determination unit 13 of the tire failure prediction system 100A determines whether the temperature T for each of the data acquired is greater than the predetermined threshold value Tr1 (step S103).

In step S103, in a case where it is determined that the temperature T is greater than the predetermined threshold value Tr1 (Yes in step S103), the determination unit 13 proceeds to processing in step S105.

In step S105, the determination unit 13 determines whether the difference between air pressures A acquired, that is, an air pressure difference AS, is greater than the predetermined threshold value Ar (step S105). In step S105, in a case where it is determined that the air pressure difference AS is not greater than the predetermined threshold value Ar (No in step S105), the determination unit 13 proceeds to processing in step S107.

In step S107, the determination unit 13 determines whether the temperature difference TS between the data of the temperature sensor 1L and the data of the temperature sensor 1R is greater than the threshold value Tr2 of the predetermined temperature difference (step S107). In step S107, in a case where the determination unit 13 determines that the temperature difference TS is greater than the threshold value Tr2 (Yes in step S107), the warning unit 30 outputs a warning (step S109), and the tire failure prediction system 100A terminates the processing (step S111). Subsequently, the tire failure prediction system 100A processes data regarding the other tires mounted on the vehicle.

On the other hand, in step S105, in a case where it is determined that the air pressure difference AS is not greater than the predetermined threshold value Ar (Yes in step S105), the determination unit 13 proceeds to processing in step S113. The determination unit 13 changes the temperature difference threshold value Tr2 to a higher threshold value Tr2' (step S113) and determines whether the temperature difference TS between the data of the temperature sensor 1L and the data of the temperature sensor 1R is greater than the changed threshold value Tr2' (step S115).

In step S115, in a case where the determination unit 13 determines that the temperature difference TS is greater than the threshold value Tr2' (Yes in step S115), the warning unit 30 outputs a warning (step S109), and the tire failure prediction system 100A terminates the processing (step S111). Subsequently, the tire failure prediction system 100A processes data regarding the other tires mounted on the vehicle.

Note that in step S103 described above, in a case where the determination unit 13 determines that the temperature T is not greater than the threshold value Tr1 (No in step S103), the tire failure prediction system 100A terminates the processing (step S111). In this case, the tire failure prediction system 100A does not output a warning. Subsequently, the tire failure prediction system 100A processes data regarding the other tires mounted on the vehicle.

Additionally, in step S107 described above, in a case where the determination unit 13 determines that the temperature difference TS is not greater than the threshold value Tr2 (No in step S107), the tire failure prediction system 100A terminates the processing (step S111). In this case, the tire failure prediction system 100A does not output a warning. Subsequently, the tire failure prediction system 100A processes data regarding the other tires mounted on the vehicle.

In the above step S115, in a case where the determination unit 13 determines that the temperature difference TS is not greater than the threshold value Tr2' (No in step S115), the tire failure prediction system 100A terminates the processing (step S111). In this case, the tire failure prediction system 100A does not output a warning. Subsequently, the tire failure prediction system 100A processes data regarding the other tires mounted on the vehicle.

As described above, according to the tire failure prediction system of the second embodiment, more accurate abnormality determination can be achieved by making determination by referring to the air pressure as well as the temperature.

Note that in the processing described above, the air pressure value acquired by the air pressure sensor may be used, or an air pressure value obtained by converting the acquired value into a temperature-converted air pressure value may be used. In other words, the air pressure value acquired by the air pressure sensor may be converted into an air pressure value at a predetermined temperature (for example, at a temperature of 25° C.), and the difference between the air pressure values calculated may be determined.

Specifically, the determination unit 13 converts the data acquired by the air pressure sensors 2L, 2R respectively into air pressure values at a predetermined temperature (e.g., a temperature of 25° C.). The determination unit 13 specifies, as the air pressure difference AS in step S105, the difference between the air pressures acquired by conversion (referred to hereinafter as the temperature-converted air pressure values), and determines whether the difference is greater than the predetermined threshold value Ar (step S105). In other words, the air pressure value of the first tire is a first temperature-converted air pressure value acquired by converting the detection value of the first air pressure sensor at a predetermined temperature, and the air pressure value of the second tire is a second temperature-converted air pressure value acquired by converting the detection value of the second air pressure sensor at the predetermined temperature, and in a case where an air pressure difference corresponding to the difference between the first temperature-converted air pressure value and the second temperature-converted air pressure value is greater than a predetermined threshold value Ar, the determination unit 13 makes the determination by using the second temperature difference threshold value that is higher than the first temperature difference threshold value.

In a case where the air pressure value acquired by the air pressure sensor is converted to a temperature-converted air pressure value, the determination unit 13 performs the conversion using a program 21 in the storage unit 20, for example, in accordance with the following equation (G1).

Temperature-converted air pressure value (tire gauge pressure) kPa=(tire gauge pressure kPa+atmospheric pressure kPa)/tire absolute temperature K×minimum ambient temperature (absolute temperature) K−atmospheric pressure kPa  (G1)

Note that the absolute temperature (K)=Celsius temperature [° C.]+273.15 (K), and atmospheric pressure=101.33 (kPa).

In equation (G1), atmospheric pressure can be acquired using a barometer (not illustrated). The lowest ambient temperature can be acquired using a thermometer (not illustrated). Here, 1 atm=101.325 kPa. Note that a table for converting the air pressure value acquired by the air pressure sensor to a temperature-converted air pressure value may be stored in the storage unit 20 and that the air pressure value may be converted into a temperature-converted air pressure value by referring to the table.

By using the temperature-converted air pressure value, the following effects are acquired. Specifically, in the same atmosphere temperature environment, even in a case where the air pressure values of the two tires acquired by the air pressure sensors 2L, 2R are the same before traveling, the tires may generate heat during traveling and a temperature difference may occur between the two tires. Also, in the case of a tire failure, a temperature difference between the two tires occurs. In such cases, the air pressure value may apparently differ due to the temperature difference. In other words, a higher temperature leads to a greater increase in air pressure, and this may prevent the correct determination using the threshold value Ar. Thus, as described above, a correct determination can be made by determining temperature-converted air pressure values and determining whether the air pressure difference AS between the temperature-converted air pressure values is greater than the predetermined threshold value Ar.

Third Embodiment

A tire failure prediction system according to a third embodiment will now be described.

Configuration

Figure 12:
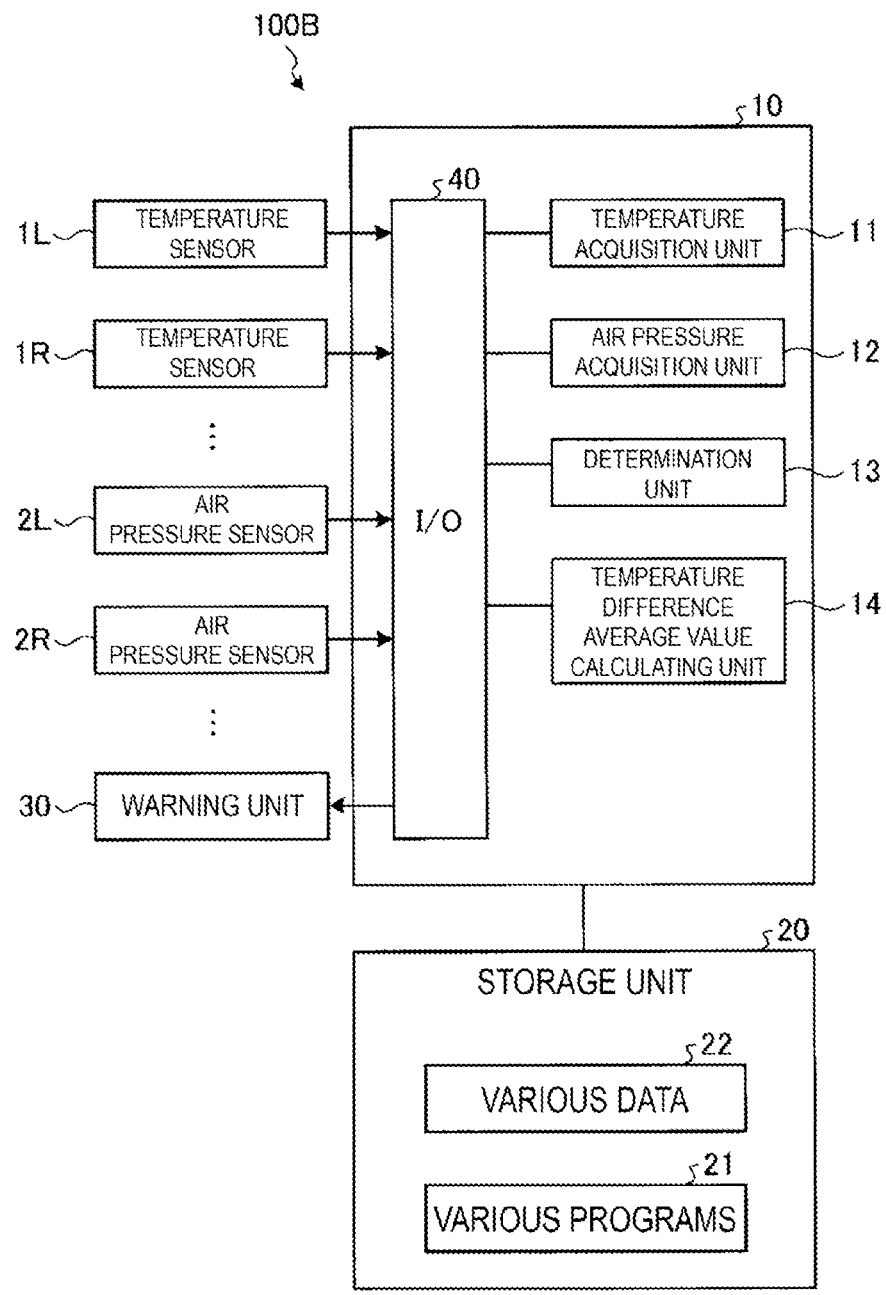
FIG. 12 is a block diagram illustrating a configuration of a tire failure prediction system according to a third embodiment.

FIG. 12 is a block diagram illustrating a configuration of a tire failure prediction system 100B according to the third embodiment. In FIG. 12, the tire failure prediction system 100B corresponds to the tire failure prediction system 100A according to the second embodiment described above in which a temperature difference average value calculating unit 14 is added to the control unit 10. The function of the temperature difference average value calculating unit 14 is realized by the CPU of the control unit 10 loading and executing a program in the storage unit 20. Note that the storage unit 20 may be provided inside the control unit 10, and the control unit 10 and the storage unit 20 may be integrated with each other.

The temperature difference average value calculating unit 14 calculates, for the data regarding the temperatures acquired by the temperature acquisition unit 11, the difference between the temperature of the first tire and the temperature of the second tire for each set of symmetrical positions. The temperature difference average value calculating unit 14 calculates the temperature difference similarly for all the tires mounted on the vehicle. Furthermore, the temperature difference average value calculating unit 14 calculates an average value TSave of the temperature differences.

In the present embodiment, data regarding the temperature T is acquired at a predetermined period length from the temperature sensors 1L, 1R mounted in the tires P in the traveling vehicle. Then, a temperature difference TS between the first tire and the second tire mounted at symmetrical positions on the same axle is calculated. The temperature difference for each set of symmetrical positions is calculated in accordance with Equation (F0) described above.

Additionally, in the present embodiment, the temperature difference average value TSave corresponding to the average value of the temperature differences for tires mounted at symmetrical positions on the same axle is calculated. The temperature difference average value TSave can be calculated by dividing the sum of the temperature differences TS for the respective sets of symmetrical positions by the number of sets of symmetrical positions ("3" in FIG. 2 and "5" in FIG. 4).

In the present embodiment, even in a case where a tire is not determined to be abnormal in the second embodiment, the tire is determined to be abnormal in a case where conditions (1) to (3) are satisfied, and a warning is output.

Condition (1): the temperature of any of the tires is greater than the preset threshold value Tr1. In other words, T(Pxy)>Tr1 . . . (F1). In Equation (F1), the threshold value Tr1 is preferably 50° C. or higher and 80° C. or lower.

Condition (2): for a tire (first tire) exceeding the threshold value Tr1 under condition (1), the relative temperature difference TS from a tire at a symmetrical position (the second tire) is greater than the predetermined threshold value Tr2. In other words, |TSx|>Tr2 . . . (F2). In Equation (F2), the threshold value Tr2 is preferably 3° C. or higher and 5° C. or lower.

Note that condition (2) described above includes a case where |TSx|>Tr2' . . . (F2').

Condition (3): for a tire exceeding the threshold value Tr2 in condition (2) described above, the difference between the relative temperature difference TS and the temperature difference average value TSave of all the tires of the same vehicle is greater than a preset threshold value Tr3. In other words, |TSx−TSave|>Tr3 ... (F3). In Equation (F3), x=1, 2, 3, ..... In Equation (F3), the threshold value Tr3 is preferably 3° C. or higher and 5° C. or lower.

Performing the above-described processing enables elimination of the effect of left-right asymmetry of temperature in the entire vehicle caused by, for example, solar radiation, left and right uneven loads, and the like. For example, in a case where the left side of the vehicle is exposed to sunlight for a long period of time, the effect of left-right asymmetry of temperature can be eliminated by performing the above-described processing.

Operation Example

Figure 13:
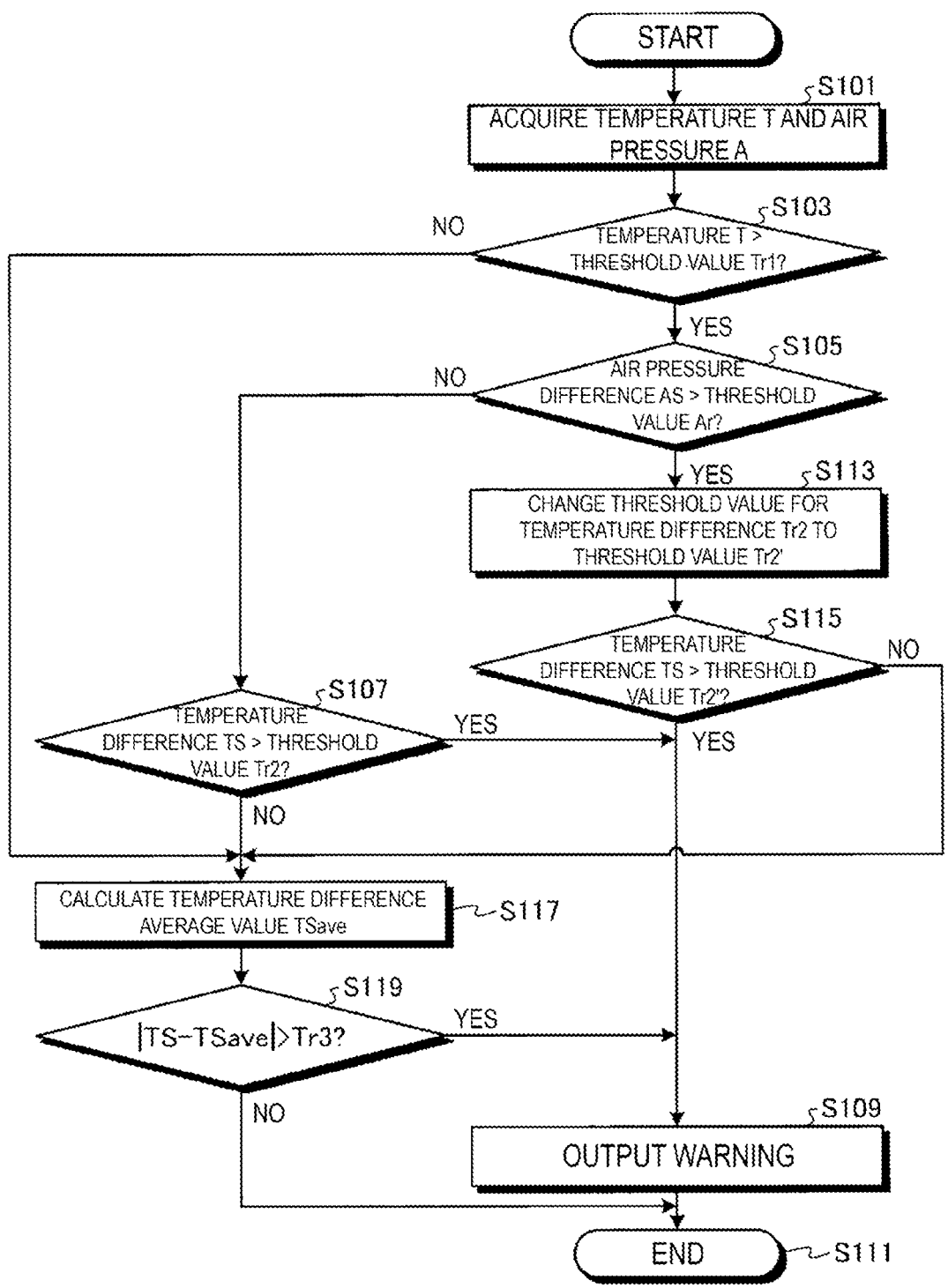
FIG. 13 is a flowchart illustrating an example of operations performed by the tire failure prediction system according to the third embodiment.

FIG. 13 is a flowchart illustrating an operation example of the tire failure prediction system 100B according to the third embodiment. In FIG. 13, processing from step S101 to step S107 is similar to the processing described with reference to FIG. 11. In the processing in FIG. 13, processing in steps S117 and S119 is added to the processing described with reference to FIG. 11. The tire failure prediction system 100B periodically performs processing in accordance with the flowchart illustrated in FIG. 13.

In step S103, in a case where it is determined that the temperature T is not greater than the threshold value Tr1 (No in step S103), the determination unit 13 proceeds to processing in step S117. Additionally, in step S107, in a case where it is determined that the temperature difference TS is not greater than the threshold value Tr2 (No in step S107), the determination unit 13 proceeds to processing in step S117.

In step S117, the temperature difference average value calculating unit 14 calculates the temperature difference average value TSave (step S117). Then, the determination unit 13 determines whether the absolute value of the difference between the temperature difference and the temperature difference average value TSave is greater than the predetermined threshold value Tr3 (step S119). In a case where the determination unit 13 determines that the absolute value of the difference is greater than the predetermined threshold value Tr3 (Yes in step S119), the warning unit 30 outputs a warning (step S109), and the tire failure prediction system 100B terminates the processing (step S111). Subsequently, the tire failure prediction system 100B processes data regarding the other tires mounted on the vehicle.

If, on the other hand, the absolute value of the difference is determined not to exceed the predetermined threshold value Tr3 (No in step S119), the tire failure prediction system 100B terminates the processing (step S111). In this case, the tire failure prediction system 100B does not output a warning. Subsequently, the tire failure prediction system 100B processes data regarding the other tires mounted on the vehicle.

As described above, according to the tire failure prediction system of the third embodiment, more accurate abnormality determination can be achieved by making determination using the temperature difference average value TSave.

Fourth Embodiment

A tire failure prediction system according to a fourth embodiment will now be described.

Configuration

In the fourth embodiment, the outside air temperature of the vehicle is acquired and used to correct the data regarding the temperature acquired from the temperature sensors 1L and 1R.

Figure 14:
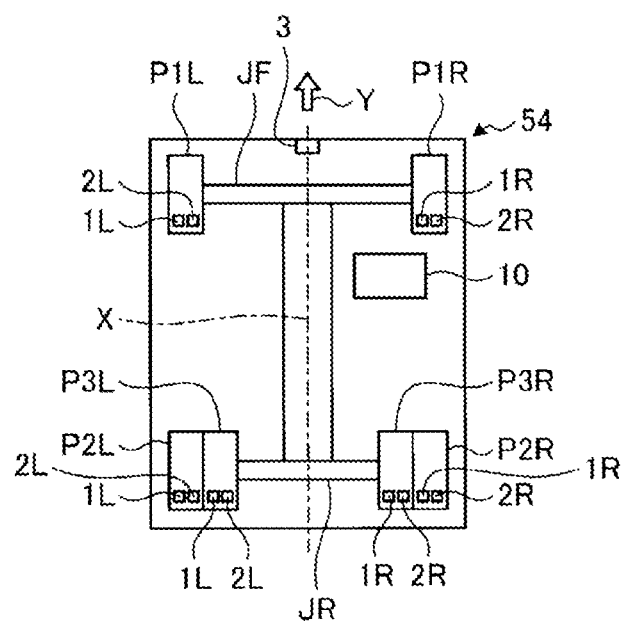
FIG. 14 is a diagram illustrating an example of positions where ambient temperature sensors are provided.

FIG. 14 is a diagram illustrating an example of the position where an ambient temperature sensor 3 is provided. The ambient temperature sensor 3 is provided at a position away from heat generating bodies in a vehicle 54. In the vehicle 54, because the engine and the tires are heat generating bodies, the ambient temperature sensor 3 is provided at a position away from the engine and the tires. For example, the ambient temperature sensor 3 is provided on the body of the vehicle. In FIG. 14, the ambient temperature sensor 3 of the present example is provided at a leading position of the vehicle 54. The ambient temperature sensor 3 detects the outside air temperature of the vehicle 54. The temperature sensor 3 outputs data regarding the outside air temperature detected.

Figure 15:
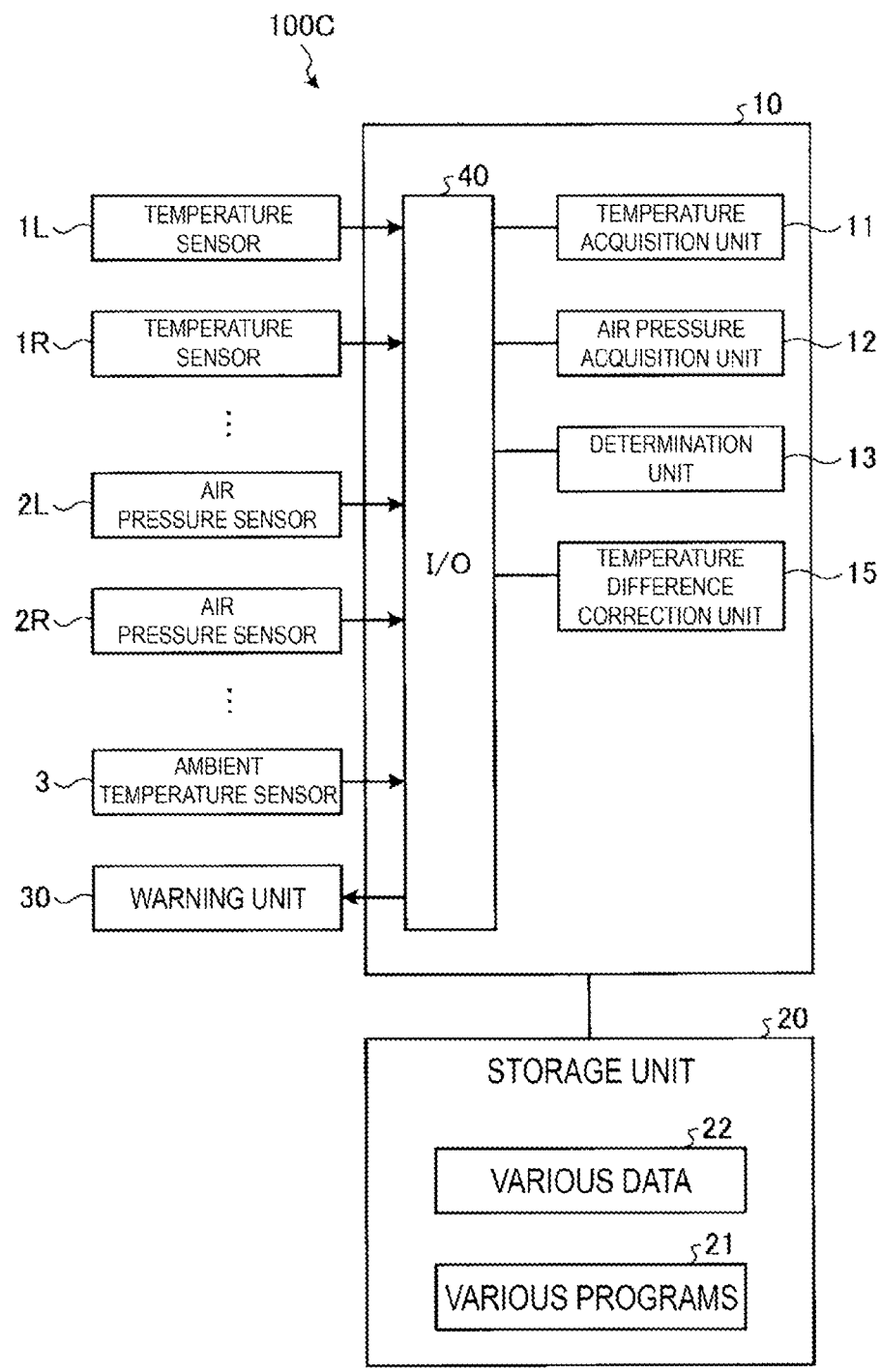
FIG. 15 is a block diagram illustrating a configuration of a tire failure prediction system according to a fourth embodiment.

FIG. 15 is a block diagram illustrating a configuration of a tire failure prediction system 100C according to the fourth embodiment. In FIG. 15, the tire failure prediction system 100C corresponds to the tire failure prediction system 100A according to the second embodiment described above additionally including the ambient temperature sensor 3 and a temperature difference correction unit 15 added to the control unit 10. The function of the temperature difference correction unit 15 is realized by the CPU of the control unit 10 loading and executing a program in the storage unit 20. Note that the storage unit 20 may be provided inside the control unit 10, and the control unit 10 and the storage unit 20 may be integrated with each other.

The temperature acquisition unit 11 acquires data from the temperature sensors 1L and 1R and the ambient temperature sensor 3. The temperature acquisition unit 11 acquires temperature data at a predetermined period length. Note that the input/output unit (I/O) 40 functions as an input unit that inputs data of the temperature sensors 1L and 1R, the ambient temperature sensor 3, and the like.

The temperature difference correction unit 15 corrects the data regarding the temperature acquired from the temperature sensors 1L and 1R with the data regarding the outside air temperature. Specifically, the temperature difference correction unit 15 determines the absolute value of the difference between the temperature data acquired from the temperature sensors 1L and 1R and the data of the outside air temperature.

In the present embodiment, data regarding the temperature T is acquired at a predetermined period length from the temperature sensors 1L, 1R mounted in the tires P in the traveling vehicle. Then, the temperature difference TS between the first tire and the second tire mounted at symmetrical positions on the same axle is calculated. The temperature difference for each set of symmetrical positions is calculated by Equation (F0).

$$TSx = T(PxL) - T(PxR) \quad (F0)$$

In Equation (F0), x=1, 2, 3, .... In Equation (F0), T(PxL) is the temperature of a tire mounted on the left side of the vehicle, and T(PxR) is the temperature of a tire mounted on the right side of the vehicle. Furthermore, in the present embodiment, the temperature Ta is acquired using the ambient temperature sensor 3.

In the present embodiment, in a case where conditions (1') and (2) described below are satisfied, a tire is determined to be abnormal and a warning is output.

Condition (1'): the temperature of any of the tires corrected with the ambient temperature Ta is greater than a preset threshold value Tr1'. In other words, |T(Pxy)−Ta|>Tr1' ... (F1'). In Equation (F1'), x=1, 2, 3, ..., and y is L or R. In Equation (F1'), the threshold value Tr1' is preferably 30° C. or higher and 50° C. or lower.

Condition (2): for a tire (first tire) that has exceeded the threshold value in condition (1') described above, the temperature difference TS from a tire at a symmetrical position (the second tire) is greater than the predetermined threshold value Tr2. In other words, |TSx|>Tr2 ... (F2). In Equation (F2), x=1, 2, 3, .... In Equation (F2), the threshold value Tr2 is preferably 3° C. or higher and 5° C. or lower.

Note that condition (2) described above includes a case where |TSx|>Tr2' ... (F2').

More accurate abnormality determination can be achieved in a case where correction is performed using the outside air temperature of the vehicle than in a case where determination is made directly using the temperature of the tire.

Operation Example

Figure 16:
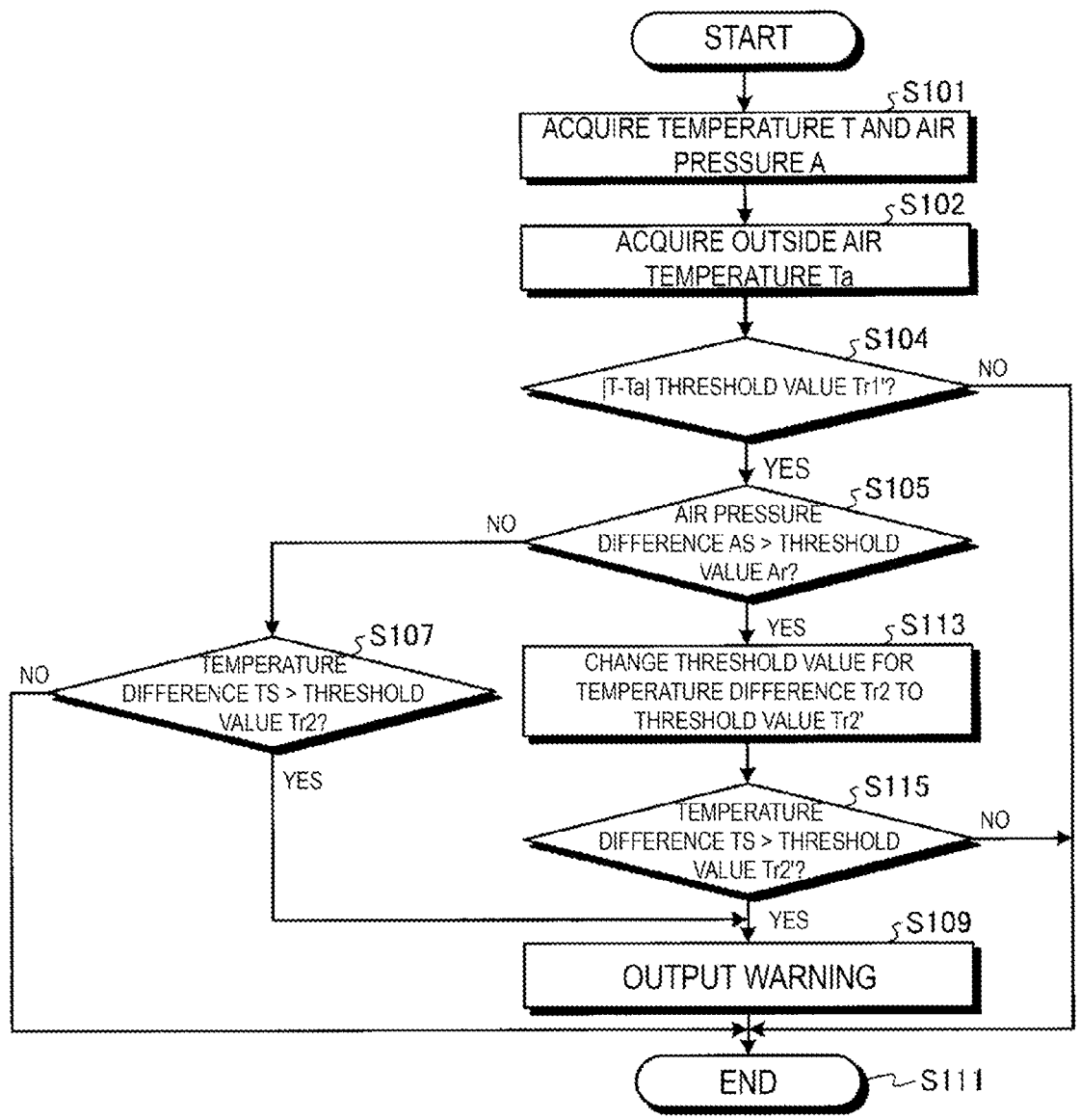
FIG. 16 is a flowchart illustrating an operation example of the tire failure prediction system according to the fourth embodiment.

FIG. 16 is a flowchart illustrating an example of operations performed by the tire failure prediction system 100C according to the fourth embodiment. The tire failure prediction system 100C according to the fourth embodiment performs processing on each of the tires mounted on the vehicle in accordance with the flowchart illustrated in FIG. 16. The tire failure prediction system 100C periodically performs processing in accordance with the flowchart illustrated in FIG. 16.

The tire failure prediction system 100C acquires data by using the temperature sensors 1L, 1R, and the air pressure sensors 2L, 2R (step S101). The tire failure prediction system 100C acquires data regarding the outside air temperature Ta from the ambient temperature sensor 3 (step S102).

Then, the determination unit 13 of the tire failure prediction system 100C determines whether the absolute value of the difference between the temperature T for each data acquired and the data regarding the outside air temperature Ta is greater than the predetermined threshold value Tr1' (step S104).

In step S104, in a case where it is determined that the absolute value of the difference between the temperature T and the data regarding the outside air temperature Ta is greater than the threshold value Tr1' (Yes in step S104), the determination unit 13 proceeds to processing in step S105. Processing in step S105 and subsequent steps is similar to the processing described with reference to FIG. 11.

Note that in step S104 described above, in a case where the determination unit 13 determines that the absolute value of the difference between the temperature T and the data regarding the outside air temperature Ta is not greater than the threshold value Tr1' (No in step S104), the tire failure prediction system 100C terminates the processing (step S111). In this case, the tire failure prediction system 100C does not output a warning. Subsequently, the tire failure prediction system 100C processes data regarding the other tires mounted on the vehicle.

As described above, according to the tire failure prediction system of the fourth embodiment, more accurate determination can be achieved by making a correction based on the outside air temperature.

Fifth Embodiment

A tire failure prediction system according to a fifth embodiment will now be described.

Configuration

Figure 17:
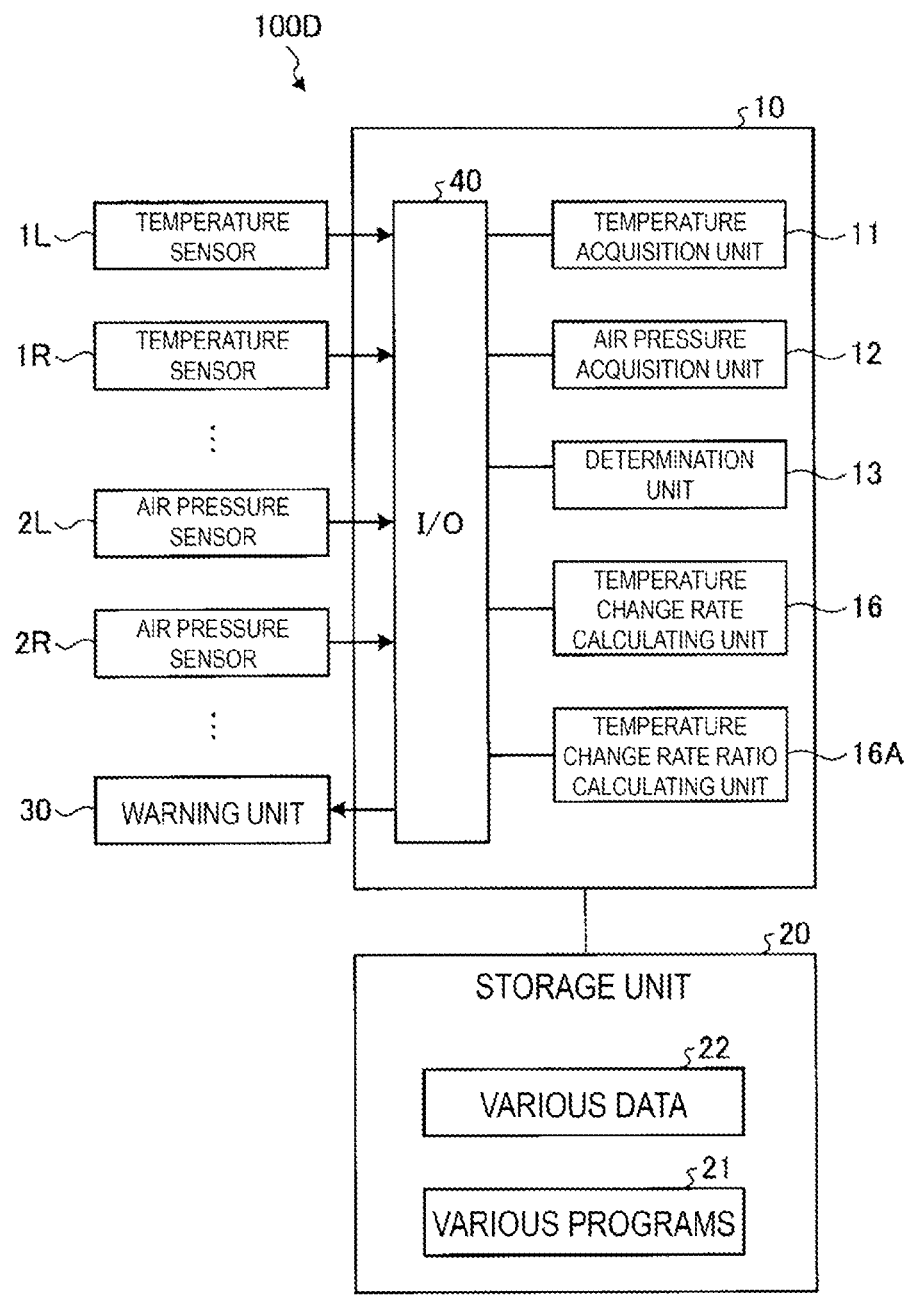
FIG. 17 is a block diagram illustrating a configuration of a tire failure prediction system according to a fifth embodiment.

FIG. 17 is a block diagram illustrating a configuration of a tire failure prediction system 100D according to the fifth embodiment. In FIG. 17, the tire failure prediction system 100D corresponds to the tire failure prediction system 100A according to the second embodiment described above in which a temperature change rate calculating unit 16 and a temperature change rate ratio calculating unit 16A are added to the control unit 10. The functions of the temperature change rate calculating unit 16 and the temperature change rate ratio calculating unit 16A are realized by the CPU of the control unit 10 loading and executing a program in the storage unit 20. Note that the storage unit 20 may be provided inside the control unit 10, and the control unit 10 and the storage unit 20 may be integrated with each other.

The temperature change rate calculating unit 16 calculates a temperature change rate KT for a certain tire (for example, the first tire) during a predetermined period of time (e.g., from time t1 until time t2). The temperature change rate ratio calculating unit 16A calculates, based on the temperature change rate KT, a temperature change rate ratio KTH for tires (for example, the first tire, the second tire) mounted on the same axle at symmetrical positions.

In the present embodiment, data regarding the temperature T is acquired at a predetermined period length from the temperature sensors 1L, 1R mounted in the tires P in the traveling vehicle. Then, a temperature difference TS between the first tire and the second tire mounted at symmetrical positions on the same axle is calculated. The temperature difference for each set of symmetrical positions is calculated in accordance with Equation (F0) described above.

Additionally, in the present embodiment, the temperature change rate KT of tires mounted at symmetrical positions on the same axle is calculated. The temperature change rate KT from time t1 until time t2 is calculated by:

KT (Px)=T(Px@t2)−T(Px@t1)/(t2−t1) ... (F4). T(Px@t1) is the temperature at time t1 and T(Px@t2) is the temperature at time t2. Furthermore, in the present embodiment, the temperature change rate ratio KTH is calculated based on the temperature change rate KT. The temperature change rate ratio KTH is calculated by:

$$KTHx=KT(PxL)/KT(PxR) \quad (F5).$$

In the present embodiment, even in a case where a tire is not determined to be abnormal in the second embodiment, in a case where condition (4) and condition (5) described below are satisfied, the tire is determined to be abnormal, and a warning is output.

Condition (4): the temperature change rate determined from the difference value in the temperature data of a time series for any of the tires is greater than a preset threshold value KTr1. In other words, KT(Px)>KTr1 ... (F6). In Equation (F6), the threshold value KTr1 is, for example, preferably 0.3 (° C./min).

Condition (5): the temperature change rate ratio KTH related to the mounting position and exceeding the threshold value KTr1 under condition (4) described above is greater than a preset threshold value KTr2. In other words, KTHx>KTr2 ... (F7). In Equation (F7), the threshold value KTr2 is, for example, preferably 1.1.

Operation Example

Figure 18:
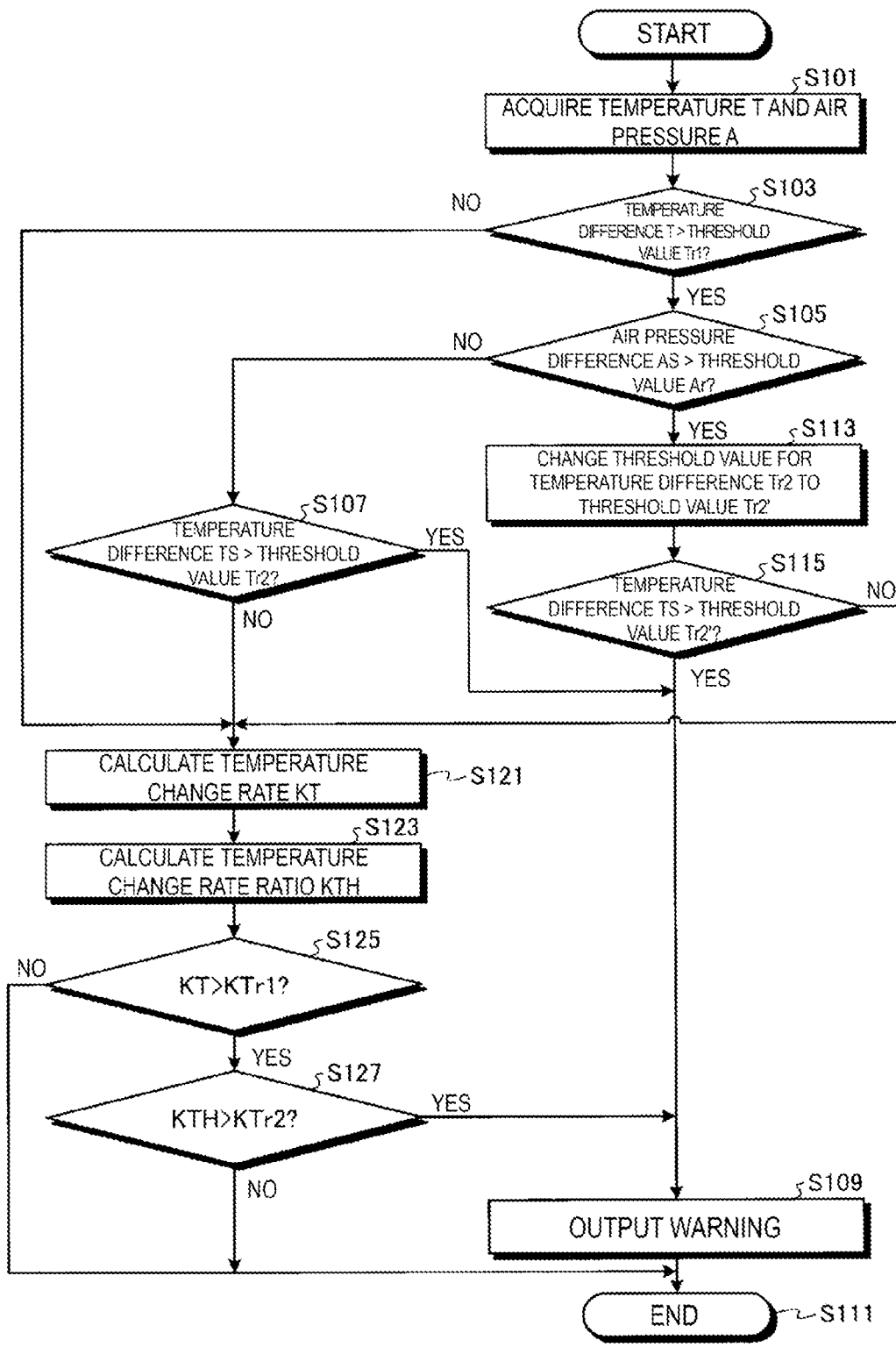
FIG. 18 is a flowchart illustrating an example of operations performed by the tire failure prediction system according to the fifth embodiment.

FIG. 18 is a flowchart illustrating an operation example of the tire failure prediction system 100D according to the fifth embodiment. In FIG. 18, processing from step S101 to step S107 is similar to the processing described with reference to FIG. 11. In the processing in FIG. 18, processing in steps S121, S123, S125, and S127 is added to the processing described with reference to FIG. 11. The tire failure prediction system 100D periodically performs processing in accordance with the flowchart illustrated in FIG. 18.

In step S103, in a case where it is determined that the temperature T is not higher than the threshold value Tr1 (No in step S103), the determination unit 13 proceeds to processing in step S121. Additionally, in step S107, in a case where it is determined that the temperature difference TS is not greater than the threshold value Tr2 (No in step S107), the determination unit 13 proceeds to processing in step S121.

In step S121, the temperature change rate calculating unit 16 calculates the temperature change rate KT (step S121). Additionally, the temperature change rate ratio calculating unit 16A calculates the temperature change rate ratio KTH (step S123). Then, the determination unit 13 determines whether the temperature change rate KT is greater than the predetermined threshold value KTr1 (step S125).

In a case where it is determined that the temperature change rate KT is greater than the predetermined threshold value KTr1 (Yes in step S125), the determination unit 13 determines whether the temperature change rate ratio KTH is greater than the predetermined threshold value KTr2 (step S127).

In a case where the temperature change rate ratio KTH is determined to be greater than the predetermined threshold value KTr2 (Yes in step S127), the warning unit 30 outputs a warning (step S109), and the tire failure prediction system 100D terminates the processing (step S111). The tire failure prediction system 100D processes data regarding the other tires mounted on the vehicle.

In a case where, in step S125, the temperature change rate KT is determined not to be greater than the predetermined threshold value KTr1 (No in step S125) or, in step S127, the temperature change rate ratio KTH is determined not to be greater than the predetermined threshold value KTr2 (No in step S127), the tire failure prediction system 100D terminates the processing (step S111). In this case, the tire failure prediction system 100D does not output a warning. The tire failure prediction system 100D processes data regarding the other tires mounted on the vehicle.

As described above, according to the tire failure prediction system of the fifth embodiment, more accurate abnormality determination can be achieved by making determination using the temperature change rate.

Sixth Embodiment

Figure 19:
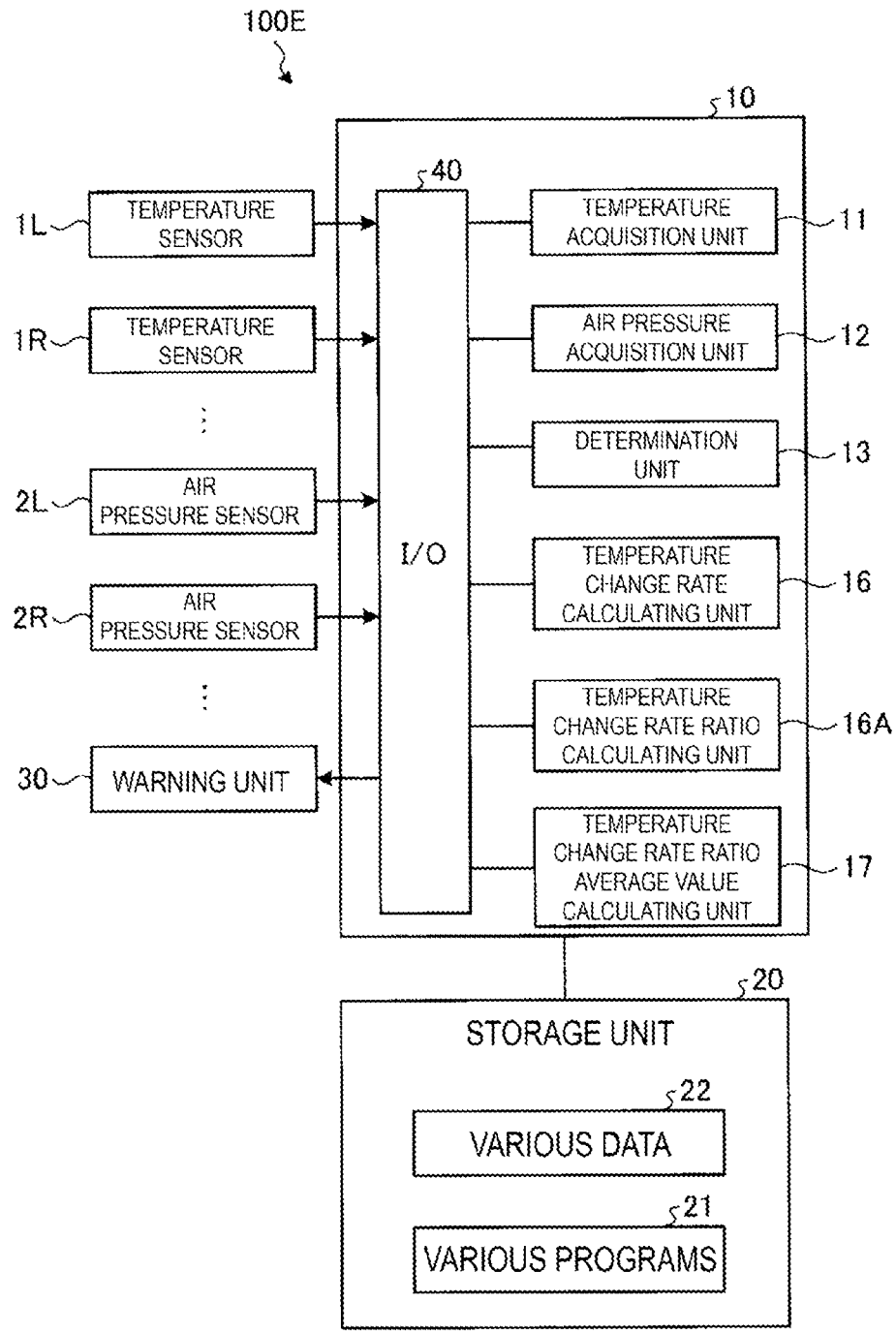
FIG. 19 is a block diagram illustrating a configuration of a tire failure prediction system according to a sixth embodiment.

A tire failure prediction system according to a sixth embodiment will be described below.
Configuration FIG. 19 is a block diagram illustrating a configuration of a tire failure prediction system 100E according to the sixth embodiment. In FIG. 19, the tire failure prediction system 100E corresponds to the tire failure prediction system 100D according to the fifth embodiment described above in which a temperature change rate ratio average value calculating unit 17 is added to the control unit 10. The function of the temperature change rate ratio average value calculating unit 17 is realized by the CPU of the control unit 10 loading and executing a program in the storage unit 20. Note that the storage unit 20 may be provided inside the control unit 10, and the control unit 10 and the storage unit 20 may be integrated with each other.

The temperature change rate ratio average value calculating unit 17 calculates an average value of the temperature change rate ratio. The temperature change rate ratio average value calculating unit 17 calculates the temperature change rate ratio KTH based on the temperature change rate KT, and calculates, based on the temperature change rate ratio KTH, a temperature change rate ratio average value KTHave corresponding to the average value of the temperature change rate ratio KTH.

In the present embodiment, data regarding the temperature T is acquired at a predetermined period length from the temperature sensors 1L, 1R mounted in the tires P in the traveling vehicle. Then, a temperature difference TS between the first tire and the second tire mounted at symmetrical positions on the same axle is calculated. The temperature difference for each set of symmetrical positions is calculated by Equation (F0).

Additionally, in the present embodiment, the temperature change rate KT of tires mounted at symmetrical positions on the same axle is calculated. The temperature change rate KT from time t1 until time t2 is calculated by:

$KT\ (Px) = T(Px@t2) - T(Px@t1)/(t2-t1)$ . . . (F4).

$T(Px@t1)$ is the temperature at time t1 and $T(Px@t2)$ is the temperature at time t2.

Furthermore, in the present embodiment, the temperature change rate ratio KTH is calculated based on the temperature change rate KT. The temperature change rate ratio KTH is calculated by:

$$KTHx = KT(PxL)/KT(PxR) \tag{F5}$$

Then, in the present embodiment, based on the temperature change rate ratio KTH, the temperature change rate ratio average value KTHave corresponding to the average value of the temperature change rate ratio KTH is calculated. The temperature change rate ratio average value KTHave can be calculated by dividing the sum of the temperature change rate ratios KTH for the respective sets of symmetrical positions by the number of sets of symmetrical positions ("3" in FIG. 2 and "5" in FIG. 4).

In the present embodiment, even in a case where a tire is not determined to be abnormal in the second embodiment, in a case where conditions (4), (5), and (6) described below are satisfied, the tire is determined to be abnormal and a warning is output.

Condition (4): the temperature change rate determined from the difference value in the temperature data of the time series for any of the tires is greater than the preset threshold value KTr1. In other words, $KT(Px) > KTr1$ . . . (F6). In Equation (F6), the threshold value KTr1 is, for example, preferably 0.3 (° C./min).

Condition (5): The temperature change rate ratio related to the mounting position and exceeding the threshold value KTr1 in condition (4) described above is greater than the preset threshold value KTr2. In other words, $KTHx > KTr2$ . . . (F7). In Equation (F7), the threshold value KTr2 is, for example, preferably 1.1.

Figure 20:
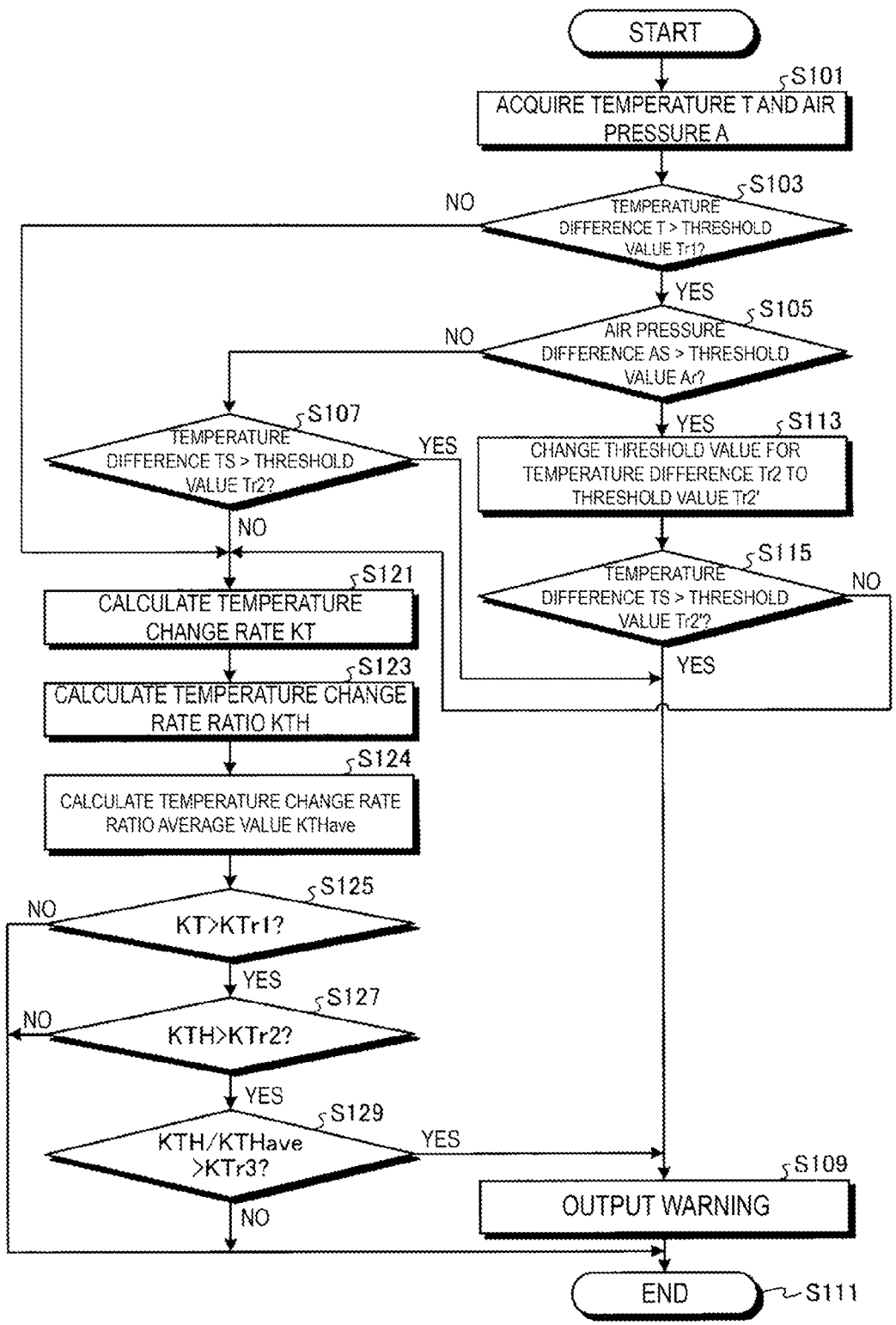
FIG. 20 is a flowchart illustrating an operation example of the tire failure prediction system according to the sixth embodiment.

Condition (6): The ratio of the temperature change rate ratio related to the mounting position and exceeding the threshold value KTr2 under condition (5) described above to the total average temperature ratio is greater than a preset threshold value KTr3. In other words, $KTHx/KTHave > KTr3$ . . . (F8). In equation (F8), the threshold value KTr3 is, for example, preferably 1.1.
Operation Example FIG. 20 is a flowchart illustrating an operation example of the tire failure prediction system 100E according to the sixth embodiment. In FIG. 20, processing from step S101 to step S123 is similar to the processing described with reference to FIG. 18. In the processing in FIG. 20, processing in steps S124 and S129 is added to the processing described with reference to FIG. 18. The tire failure prediction system 100E periodically performs processing in accordance with the flowchart illustrated in FIG. 20.

In step S103, in a case where it is determined that the temperature T is not higher than the threshold value Tr1 (No in step S103), the determination unit 13 proceeds to processing in step S121. Additionally, in step S107, in a case where it is determined that the temperature difference TS is not greater than the threshold value Tr2 (No in step S107), the determination unit 13 proceeds to processing in step S121.

In step S121, the temperature change rate calculating unit 16 calculates the temperature change rate KT (step S121). Additionally, the temperature change rate ratio calculating unit 16A calculates the temperature change rate ratio KTH (step S123). Furthermore, the temperature change rate ratio average value calculating unit 17 calculates the temperature change rate ratio average value KTHave (step S124). Then, the determination unit 13 determines whether the temperature change rate KT is greater than the predetermined threshold value KTr1 (step S125).

In a case where it is determined that the temperature change rate KT is greater than the predetermined threshold value KTr1 (Yes in step S125), the determination unit 13 determines whether the temperature change rate ratio KTH is greater than the predetermined threshold value KTr2 (step S127). In a case where the temperature change rate ratio KTH is determined to be greater than the predetermined threshold value KTr2 (Yes in step S127), the determination unit 13 determines whether the ratio of the temperature change rate ratio KTH to the temperature change rate ratio average value KTHave is greater than the predetermined threshold value KTr3 (step S129).

In a case where the above-described ratio is determined to be greater than the predetermined threshold value KTr3 (Yes in step S129), the warning unit 30 outputs a warning (step S109), and the tire failure prediction system 100E terminates the processing (step S111). The tire failure prediction system 100E processes data regarding the other tires mounted on the vehicle.

In step S129, in a case where the above-described ratio is determined not to be greater than the predetermined threshold value KTr3 (No in step S129), the tire failure prediction system 100E terminates the processing (step S111). In this case, the tire failure prediction system 100E does not output a warning. The tire failure prediction system 100E processes data regarding the other tires mounted on the vehicle.

Note that, as is the case with the processing described with reference to FIG. 18, in a case where, in step S125, the temperature change rate KT is determined not to be greater than the predetermined threshold value KTr1 (No in step S125) or in a case where, in step S127, the temperature change rate ratio KTH is determined not to be greater than the predetermined threshold value KTr2 (No in step S127), the tire failure prediction system 100E terminates the processing (step S111). In this case, the tire failure prediction system 100E does not output a warning. The tire failure prediction system 100E processes data regarding the other tires mounted on the vehicle.

As described above, according to the tire failure prediction system of the sixth embodiment, more accurate abnormality determination can be achieved by making determination using the temperature change rate ratio.

Seventh Embodiment

Figure 21:
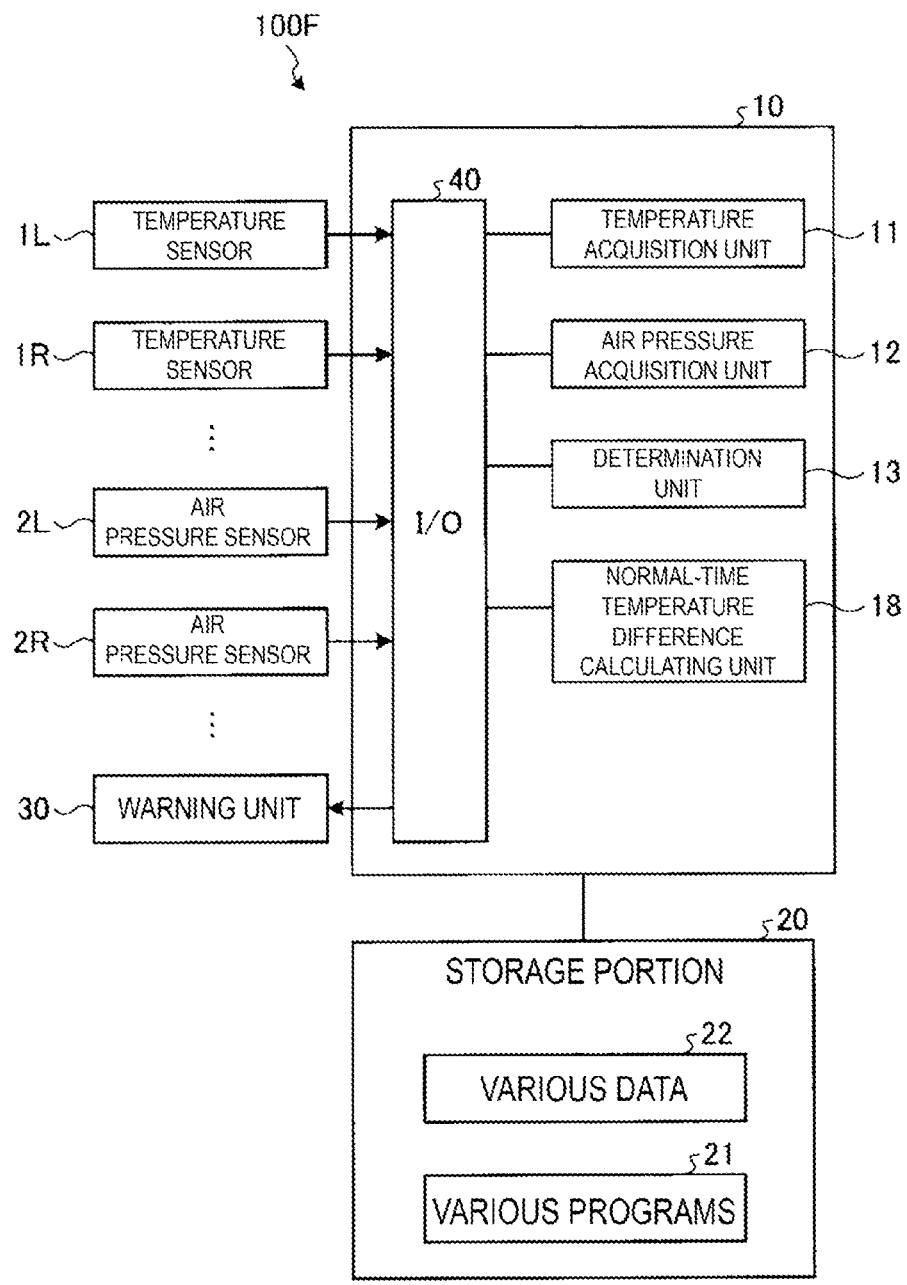
FIG. 21 is a block diagram illustrating a configuration of a tire failure prediction system according to a seventh embodiment.

A tire failure prediction system according to a seventh embodiment will be described below.
Configuration
FIG. 21 is a block diagram illustrating a configuration of a tire failure prediction system 100F according to the seventh embodiment. In FIG. 21, the tire failure prediction system 100F corresponds to the tire failure prediction system 100A according to the second embodiment described above in which a normal-time temperature difference calculating unit 18 is added to the control unit 10. The function of the normal-time temperature difference calculating unit 18 is realized by the CPU of the control unit 10 loading and executing a program in the storage unit 20. Note that the storage unit 20 may be provided inside the control unit 10, and the control unit 10 and the storage unit 20 may be integrated with each other.

The normal-time temperature difference calculating unit 18 calculates a temperature difference during normal time TSM for tires mounted at symmetrical positions on the same axle.

In the present embodiment, data regarding the temperature T is acquired at a predetermined period length from the temperature sensors 1L, 1R mounted in the tires P in the traveling vehicle. Then, a temperature difference TS between the first tire and the second tire mounted at symmetrical positions on the same axle is calculated. The temperature difference for each set of symmetrical positions is calculated in accordance with Equation (F0) described above.

Additionally, in the present embodiment, the temperature difference during normal time TSM for tires mounted at symmetrical positions on the same axle is calculated based on data regarding the temperature for a predetermined period of time. The predetermined period of time is preferably a period of time including one cycle of traveling operation.

In the present embodiment, even in a case where a tire is not determined to be abnormal in the second embodiment, the tire is determined to be abnormal in a case where condition (1) and condition (7) described below are satisfied, and a warning is output.

Condition (1): the temperature of any of the tires is greater than the preset threshold value Tr1. In other words, $T(Pxy) > Tr1 \ldots$ (F1). In Equation (F1), the threshold value Tr1 is preferably 50° C. or higher and 80° C. or lower.

Condition (7): the absolute value of the difference between the mounting position temperature difference TS related to the tire exceeding the threshold value Tr1 under condition (1) described above and the temperature difference during normal time TSM is greater than a preset threshold value Tr4. In other words, $|TSx - TSMx| > Tr4 \ldots$ (F9). In Equation (F9), the threshold value Tr4 is preferably 3° C. or higher and 5° C. or lower.

Figure 22:
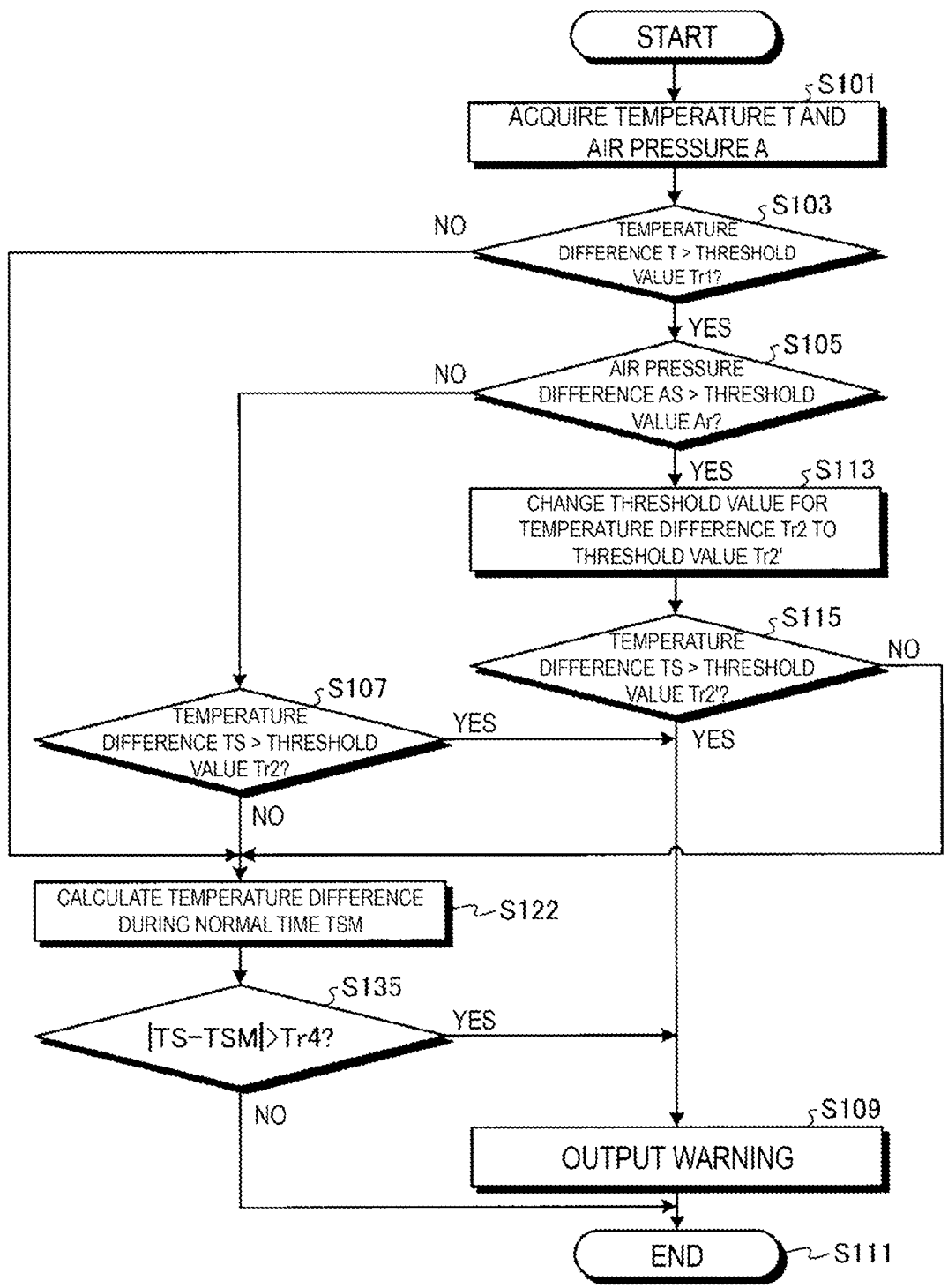
FIG. 22 is a flowchart illustrating an operation example of the tire failure prediction system according to the seventh embodiment.

Operation Example
FIG. 22 is a flowchart illustrating an example of operations performed by the tire failure prediction system 100F according to the seventh embodiment. In FIG. 22, processing from step S101 to step S107 is similar to the processing described with reference to FIG. 11. In the processing in FIG. 22, processing in steps S122 and S135 is added to the processing described with reference to FIG. 11. The tire failure prediction system 100F periodically performs processing in accordance with the flowchart illustrated in FIG. 22.

In step S103, in a case where it is determined that the temperature T is not greater than the threshold value Tr1 (No in step S103), the determination unit 13 proceeds to processing in step S122. Additionally, in step S107, in a case where it is determined that the temperature difference TS is not greater than the threshold value Tr2 (No in step S107), the determination unit 13 proceeds to processing in step S122.

In step S122, the normal-time temperature difference calculating unit 18 calculates the temperature difference during normal time TSM (step S122). Then, the determination unit 13 determines whether the absolute value of the difference between the temperature difference TS and the temperature difference during normal time TSM is greater than a predetermined threshold value Tr4 (step S135).

In a case where the absolute value of the difference is determined to be greater than the predetermined threshold value Tr4 (Yes in step S135), the warning unit 30 outputs a warning (step S109), and the tire failure prediction system 100F terminates the processing (step S111). Subsequently, the tire failure prediction system 100F processes data regarding the other tires mounted on the vehicle.

In step S135, in a case where the absolute value of the above-described difference is determined not to be greater than the predetermined threshold value Tr4 (No in step S135), the tire failure prediction system 100F terminates the processing (step S111). In this case, the tire failure prediction system 100F does not output a warning. Subsequently, the tire failure prediction system 100F processes data regarding the other tires mounted on the vehicle.

As described above, according to the tire failure prediction system of the seventh embodiment, more accurate abnormality determination can be achieved by making determination based on the normal-time temperature difference for the predetermined period of time.

Eighth Embodiment

Figure 23:
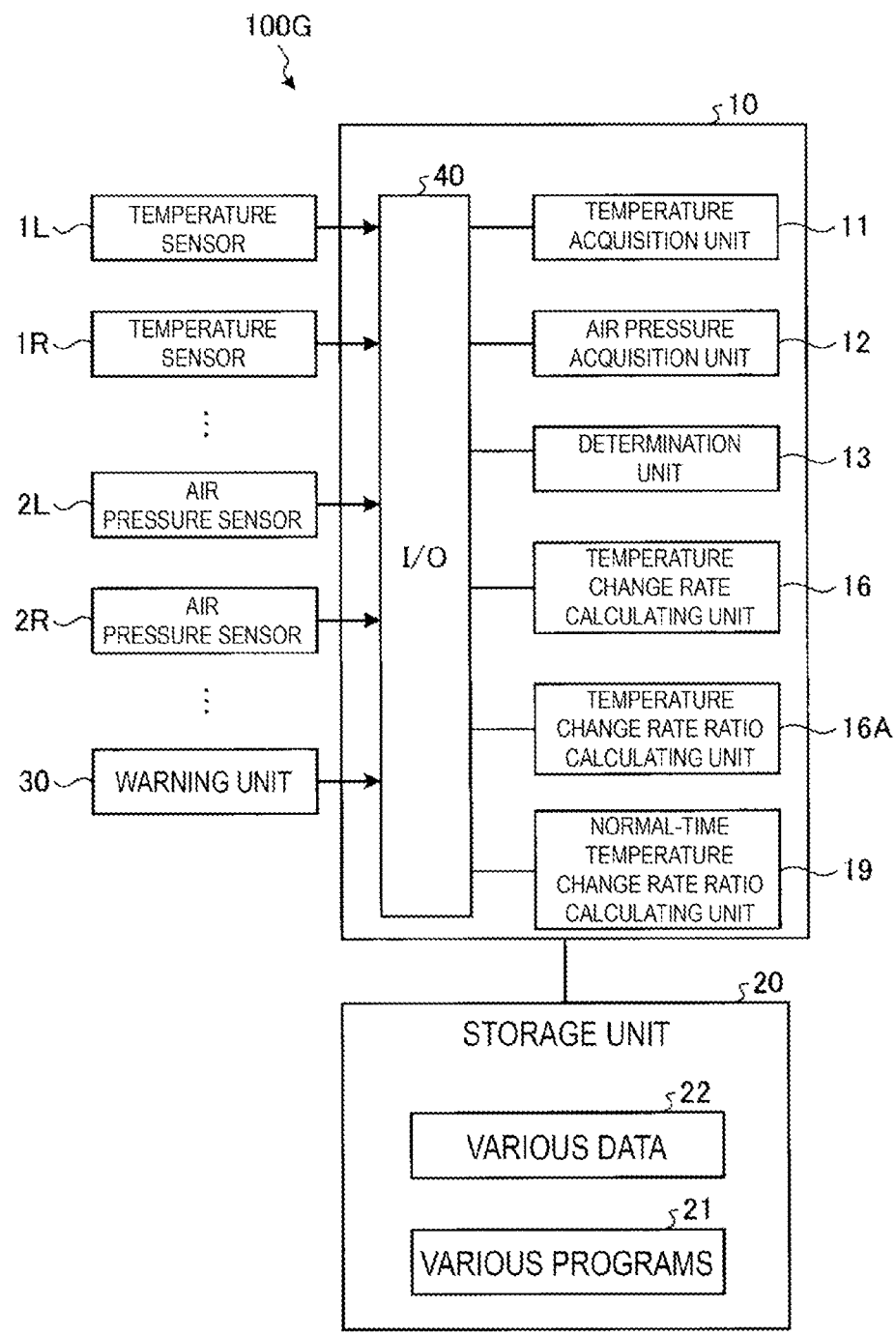
FIG. 23 is a block diagram illustrating a configuration of a tire failure prediction system according to an eighth embodiment.

A tire failure prediction system according to an eighth embodiment will be described below.
Configuration FIG. 23 is a block diagram illustrating a configuration of a tire failure prediction system 100G according to the eighth embodiment. In FIG. 23, the tire failure prediction system 100G corresponds to the tire failure prediction system 100A according to the second embodiment described above in which the temperature change rate calculating unit 16, the temperature change rate ratio calculating unit 16A, and a normal-time temperature change rate ratio calculating unit 19 are added to the control unit 10. The functions of the temperature change rate calculating unit 16 and the normal-time temperature change rate ratio calculating unit 19 are realized by the CPU of the control unit 10 loading and executing programs in the storage unit 20. Note that the storage unit 20 may be provided inside the control unit 10, and the control unit 10 and the storage unit 20 may be integrated with each other.

The temperature change rate calculating unit 16 calculates the temperature change rate KT for a certain tire (for example, the first tire) during a predetermined period of time (e.g., from time t1 until time t2). The temperature change rate ratio calculating unit 16A calculates, based on the temperature change rate KT, a temperature change rate ratio KTH for tires (for example, the first tire, the second tire) mounted on the same axle at symmetrical positions. The normal-time temperature change rate ratio calculating unit 19 calculates a temperature change rate ratio during normal time KTHM based on the temperature change rate ratio KTH for a predetermined period of time. The predetermined period of time is preferably a period of time including one cycle of traveling operation.

In the present embodiment, data regarding the temperature T is acquired at a predetermined period length from the temperature sensors 1L, 1R mounted in the tires P in the traveling vehicle. Then, a temperature difference TS between the first tire and the second tire mounted at symmetrical positions on the same axle is calculated. The temperature difference for each set of symmetrical positions is calculated in accordance with Equation (F0) described above.

Additionally, in the present embodiment, the temperature change rate KT of tires mounted at symmetrical positions on the same axle is calculated. The temperature change rate, KT from time t1 until time t2 is calculated by equation (F4) described above. Furthermore, in the present embodiment, the temperature change rate ratio KTH is calculated based on the temperature change rate KT. The temperature change rate ratio KTH is calculated in accordance with the above-described equation (F5). Then, in the present embodiment, the temperature change rate ratio during normal time KTHM is calculated based on the temperature change rate ratio KTH for the predetermined period of time.

In the present embodiment, even in a case where a tire is not determined to be abnormal in the second embodiment, a tire is determined to be abnormal in a case where condition (4) and condition (8) described below are satisfied, and a warning is output.

Condition (4): the temperature change rate determined from the difference value in the temperature data of the time series for any of the tires is greater than the preset threshold value KTr1. In other words, KT(Px)>KTr1 . . . (F6). In Equation (F6), the threshold value KTr1 is, for example, preferably 0.3 (° C./min).

Figure 24:
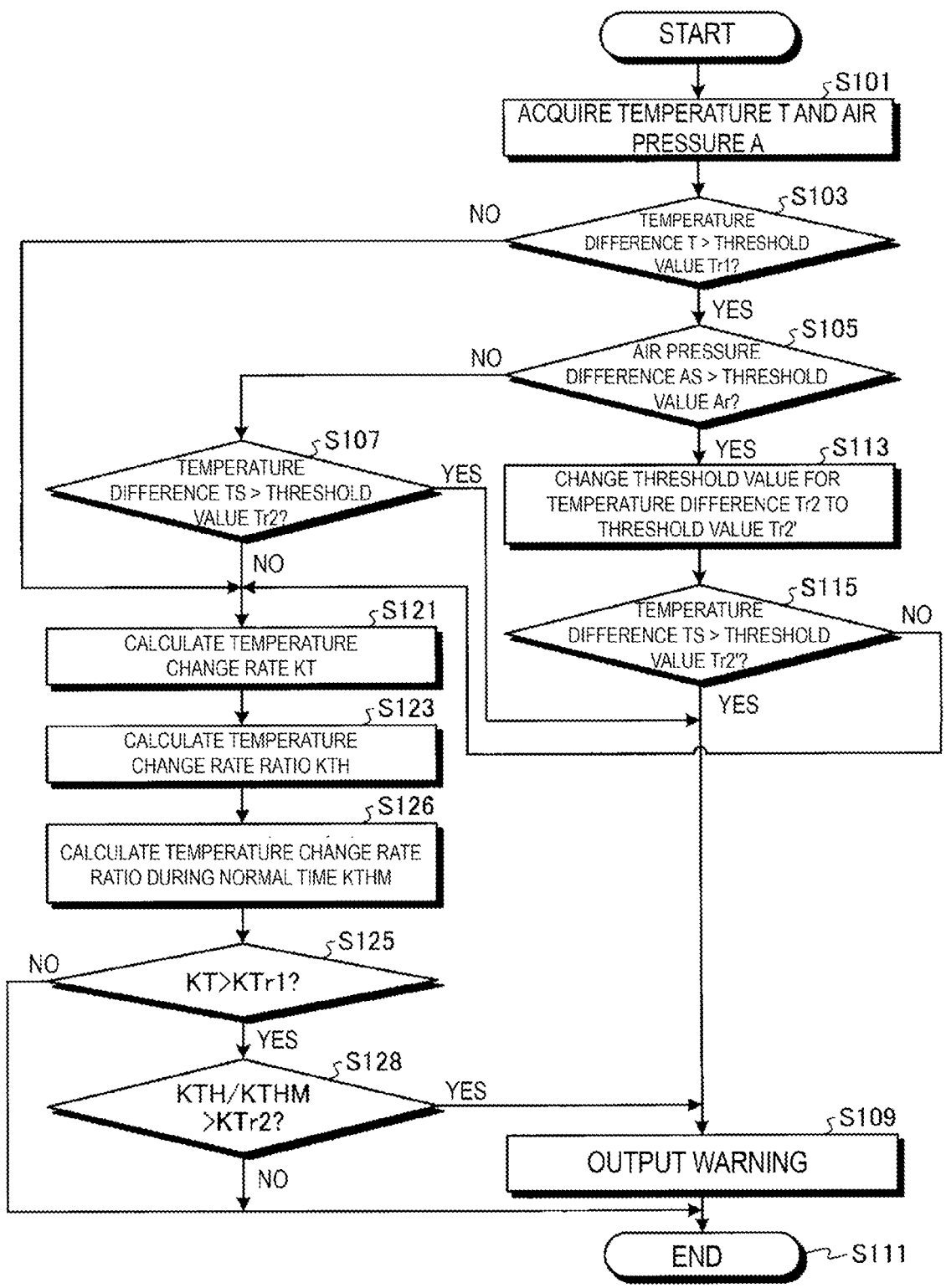
FIG. 24 is a flowchart illustrating an operation example of the tire failure prediction system according to the eighth embodiment.

Condition (8): A ratio KTH/KTHM between the temperature change rate ratio related to the mounting position and exceeding the threshold value KTr1 in condition (1) described above and the temperature change rate ratio during normal time KTHM is greater than the preset threshold value KTr2. In other words, KTH/KTHM>KTr2 . . . (F7). In Equation (F7), the threshold value KTr2 is, for example, preferably 1.1.
Operation Example FIG. 24 is a flowchart illustrating an operation example of the tire failure prediction system 100G according to the eighth embodiment. In FIG. 24, processing from step S101 to step S107 is similar to the processing described with reference to FIG. 11. In the processing in FIG. 24, processing in steps S121, S123, S126, S125, and S128 is added to the processing described with reference to FIG. 11. The tire failure prediction system 100G periodically performs processing in accordance with the flowchart illustrated in FIG. 24.

In step S103, in a case where it is determined that the temperature T is not higher than the threshold value Tr1 (No in step S103), the determination unit 13 proceeds to processing in step S121. Additionally, in step S107, in a case where it is determined that the temperature difference TS is not greater than the threshold value Tr2 (No in step S107), the determination unit 13 proceeds to processing in step S121.

In step S121, the temperature change rate calculating unit 16 calculates the temperature change rate KT (step S121). Additionally, the temperature change rate ratio calculating unit 16A calculates the temperature change rate ratio KTH (step S123). Furthermore, the normal-time temperature change rate ratio calculating unit 19 calculates the temperature change rate ratio during normal time KTHM (step S126). Then, the determination unit 13 determines whether the temperature change rate KT is greater than the predetermined threshold value KTr1 (step S125).

In a case where it is determined that the temperature change rate KT is greater than the predetermined threshold value KTr1 (Yes in step S125), the determination unit 13 determines whether the ratio of the temperature change rate ratio KTH to the temperature change rate ratio during normal time KTHM is greater than the predetermined threshold value KTr2 (step S128).

In a case where the above-described ratio is determined to be greater than the predetermined threshold value KTr2 (Yes in step S128), the warning unit 30 outputs a warning (step S109), and the tire failure prediction system 100G terminates the processing (step S111). Subsequently, the tire failure prediction system 100G processes data regarding the other tires mounted on the vehicle.

In a case where in step S128, the above-described ratio is determined not to be greater than the predetermined threshold value KTr2 (No in step S128), the tire failure prediction system 100G terminates the processing (step S111). In this case, the tire failure prediction system 100G does not output a warning. Subsequently, the tire failure prediction system 100G processes data regarding the other tires mounted on the vehicle.

As described above, according to the tire failure prediction system of the eighth embodiment, more accurate abnormality determination can be achieved by making determination based on the normal-time temperature change rate ratio for the predetermined period of time.

Ninth Embodiment

Figure 25:
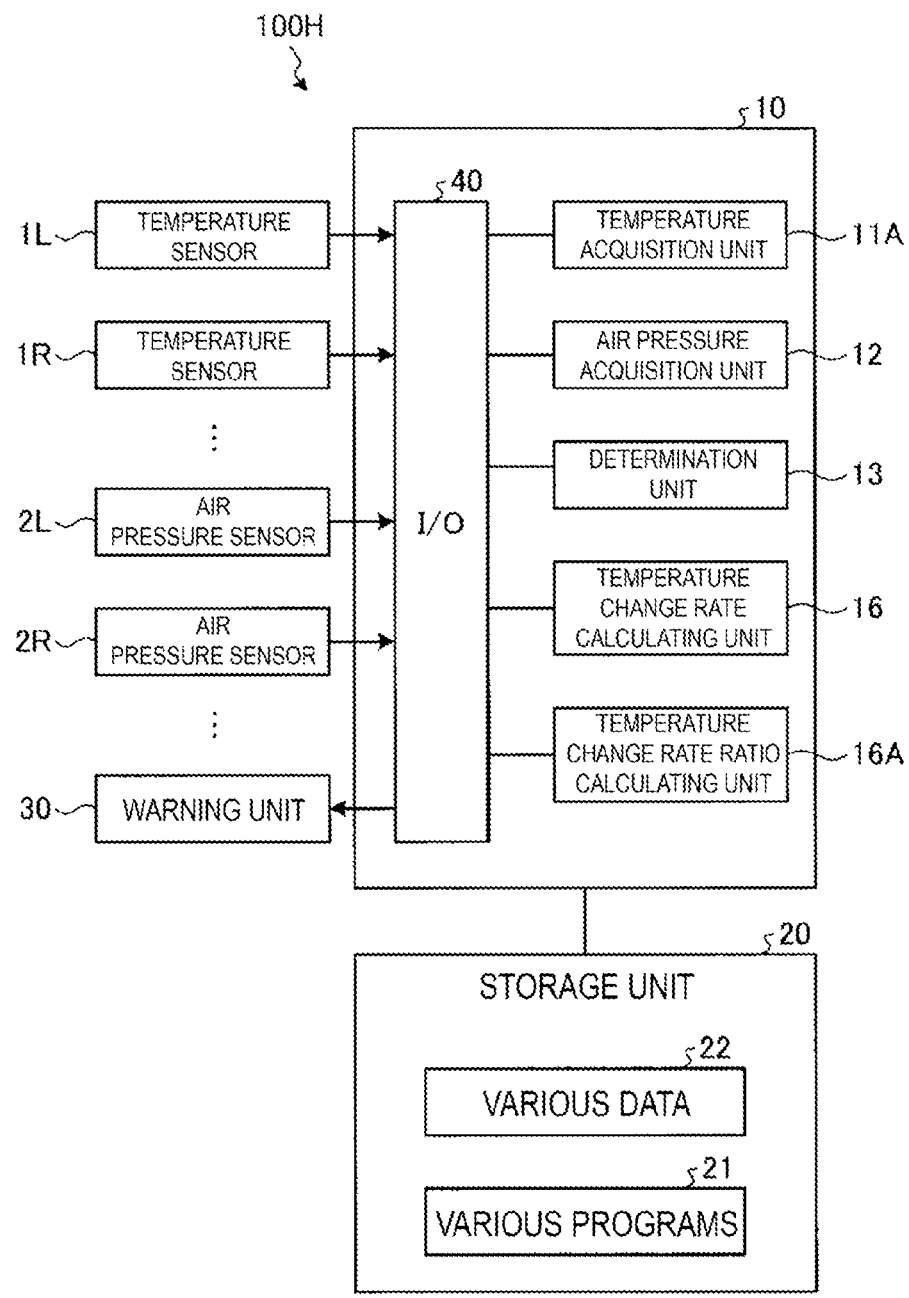
FIG. 25 is a block diagram illustrating a configuration of a tire failure prediction system according to a ninth embodiment.

A tire failure prediction system according to a ninth embodiment will be described below.
Configuration
FIG. 25 is a block diagram illustrating a configuration of a tire failure prediction system 100H according to the ninth embodiment. In FIG. 25, the tire failure prediction system 100H has a configuration in which another temperature acquisition unit 11A is used in the control unit 10 of the tire failure prediction system 100D according to the fifth embodiment described above. The function of the temperature acquisition unit 11A is realized by the CPU of the control unit 10 loading and executing a program in the storage unit 20. Note that the storage unit 20 may be provided inside the control unit 10, and the control unit 10 and the storage unit 20 may be integrated with each other.

The temperature acquisition unit 11A acquires temperature data from the temperature sensors 1L and 1R. The temperature acquisition unit 11A acquires temperature data at a predetermined period length. Additionally, in a case where the temperature of a tire is higher than the preset threshold value Tr1 and the difference in tire temperature between tires at symmetrical positions is greater than the threshold value Tr2, the temperature acquisition unit 11A reduces the period length at which data regarding the temperature is acquired.

In the present embodiment, data regarding the temperature T is acquired at a predetermined period length from the temperature sensors 1L, 1R mounted in the tires P in the traveling vehicle. Then, a temperature difference TS between the first tire and the second tire mounted at symmetrical positions on the same axle is calculated. The temperature difference for each set of symmetrical positions is calculated in accordance with Equation (F0) described above.

In the present embodiment, in a case where conditions (1) and (2) described below are satisfied, the period length at which data regarding the temperature is acquired (hereinafter referred to as the temperature data sampling interval) is changed. In this embodiment, the temperature data sampling interval is reduced. The reduced temperature data sampling interval is preferably 1 minute or less.

Condition (1): the temperature of any of the tires is greater than the preset threshold value Tr1. In other words, $T(Pxy) > Tr1$ ... (F1). In Equation (F1), the threshold value Tr1 is preferably 50° C. or higher and 80° C. or lower.

Condition (2): for a tire (first tire) exceeding the threshold value Tr1 under condition (1), the relative temperature difference TS from a tire at a symmetrical position (the second tire) is greater than the predetermined threshold value Tr2. In other words, $|TSx| > Tr2$ ... (F2). In Equation (F2), the threshold value Tr2 is preferably 3° C. or higher and 5° C. or lower.

Note that condition (2) described above includes a case where $|TSx| > Tr2'$ ... (F2').

In the present embodiment, with the temperature data sampling interval reduced, data regarding the temperature T is acquired at a predetermined period length from the temperature sensors 1L, 1R mounted in the tires P in the traveling vehicle. Then, a temperature difference TS between the first tire and the second tire mounted at symmetrical positions on the same axle is calculated. The temperature difference for each set of symmetrical positions is calculated in accordance with Equation (F0) described above.

Then, in the present embodiment, in a case where conditions (4) and (5) described below are satisfied, the tire is determined to be abnormal, and a warning is output.

Condition (4): the temperature change rate determined from the difference value in the temperature data of the time series for any of the tires is greater than a preset threshold value KTr1. In other words, $KT(Px) > KTr1$ ... (F6). In Equation (F6), the threshold value KTr1 is, for example, preferably 0.3 (° C./min).

Condition (5): the temperature change rate ratio KTH related to the mounting position and exceeding the threshold value KTr1 under condition (4) described above is greater than the preset threshold value KTr2. In other words, $KTHx > KTr2$ ... (F7). In Equation (F7), the threshold value KTr2 is, for example, preferably 1.1.

Figure 26:
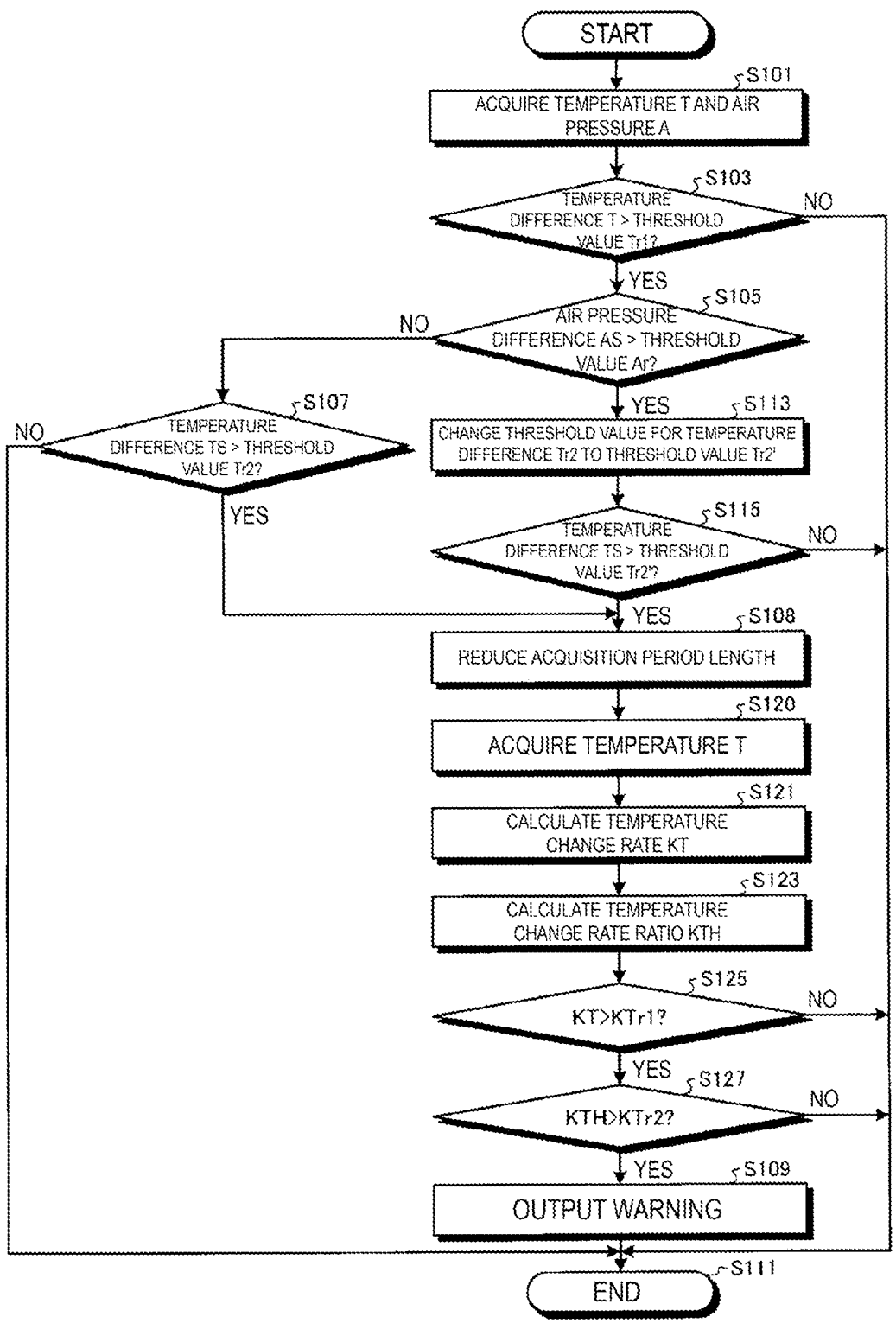
FIG. 26 is a flowchart illustrating an operation example of a tire failure prediction system 100H according to the ninth embodiment.

As described above, according to the tire failure prediction system of the ninth embodiment, more accurate abnormality determination can be achieved by reducing the temperature data sampling interval. Additionally, according to the tire failure prediction system of the ninth embodiment, determination accuracy is improved by making abnormality determination based on both the temperature difference for each mounting position and the temperature change rate.
Operation Example
FIG. 26 is a flowchart illustrating an operation example of the tire failure prediction system 100H according to the ninth embodiment. In FIG. 26, processing from step S101 to step S107 is similar to the processing described with reference to FIG. 11. In the processing in FIG. 26, processing in steps S108, S121, S123, S125, and S127 is added to the processing described with reference to FIG. 11. The tire failure prediction system 100H periodically performs processing in accordance with the flowchart illustrated in FIG. 26.

In step S107, in a case where the determination unit 13 determines that the temperature difference TS is greater than the threshold value Tr2 (Yes in step S107), the determination unit 13 proceeds to processing in step S108. In step S108, the temperature acquisition unit 11A reduces the period length at which data regarding the temperature is acquired (step S108) and proceeds to processing in step S120.

In step S120, the tire failure prediction system 100H acquires data using the temperature sensors 1L, 1R (step S120) and proceeds to processing in step S121.

In step S121, the temperature change rate calculating unit 16 calculates the temperature change rate KT (step S121). Additionally, the temperature change rate ratio calculating unit 16A calculates the temperature change rate ratio KTH (step S123). Then, the determination unit 13 determines whether the temperature change rate KT is greater than the predetermined threshold value KTr1 (step S125).

In a case where it is determined that the temperature change rate KT is greater than the predetermined threshold value KTr1 (Yes in step S125), the determination unit 13 determines whether the temperature change rate ratio KTH is greater than the predetermined threshold value KTr2 (step S127).

In a case where the temperature change rate ratio KTH is determined to be greater than the predetermined threshold value KTr2 (Yes in step S127), the warning unit 30 outputs a warning (step S109), and the tire failure prediction system 100H terminates the processing (step S111). Subsequently, the tire failure prediction system 100H processes data regarding the other tires mounted on the vehicle.

In a case where, in step S125, the temperature change rate KT is determined not to be greater than the predetermined threshold value KTr1 (No in step S125) or, in step S127, the temperature change rate ratio KTH is determined not to be greater than the predetermined threshold value KTr2 (No in step S127), the tire failure prediction system 100H terminates the processing (step S111). In this case, the tire failure prediction system 100H does not output a warning. Subsequently, the tire failure prediction system 100H processes data regarding the other tires mounted on the vehicle.

As described above, according to the tire failure prediction system of the ninth embodiment, more accurate abnormality determination can be achieved by making determination with the temperature data sampling interval reduced.

Note that, in a case where condition (1) and condition (2) described above are satisfied, the temperature data sampling interval may further be reduced. In other words, three types of temperature data sampling intervals may be set to allow two-step reduction of the temperature data sampling interval.

Tire Failure Prediction Method

According to the tire failure prediction system described above, a tire failure prediction method as described below is realized. Specifically, a tire failure prediction method is realized that includes steps of acquiring temperature values of a first tire and a second tire mounted at symmetrical positions on an identical axle of a traveling vehicle, the temperature values being respectively detected by first and second temperature sensors, and determining that the first tire has a possibility of failure in a case where the temperature value of the first tire is greater than a predetermined threshold value, and a temperature difference corresponding to a difference between the temperature value of the first tire and the temperature value of the second tire is greater than a predetermined first temperature threshold value. According to this method, abnormality determination can be achieved with higher accuracy, and failure can be predicted.

Additionally, the method further includes the step of acquiring air pressure values of inner portions of the above-described first tire and the above-described second tire, the air pressure values being detected by first and second air pressure sensors, in which, in the determining, in a case where an air pressure difference corresponding to a difference between the air pressure value of the first tire and the air pressure value of the second tire is greater than a predetermined threshold value, a determination may be made using a second temperature difference threshold value that is higher than the first temperature difference threshold value. According to this method, abnormality determination can be achieved with higher accuracy, and failure can be predicted.

MODIFIED EXAMPLES

Modified examples of the tire failure prediction system described above will be described below.

Modified Example 1

In the flowcharts of operation examples in which temperature and air pressure are acquired, the processing may be performed based on temperature without acquiring air pressure. In other words, in the flowcharts of FIGS. 13, 18, 20, 22, 24, and 26, the processing may be performed based on the temperature acquired without acquiring air pressure.

Modified Example 2

For the double tire, two tires are mounted on the same wheel, and thus it may not be possible to determine which of the tires has an abnormality. In such a case, for example, in the double tire, a tire having a larger absolute value of temperature can be determined to be abnormal. For example, by determining the temperature difference between the two tires, the tire with a higher temperature can be identified.

Modified Example 3

In a case where data is acquired wirelessly from each sensor, the control unit 10 may acquire data directly from each sensor, or, with a relay provided, the control unit 10 may acquire data from each sensor via the relay.

Modified Example 4

A warning signal output from the control unit 10 may be transmitted to an external device external to the tire failure prediction system, and the warning may be output from the external device to the driver of the vehicle. For example, the warning signal may be transmitted to a mobile communication network, and a control signal may be transmitted from a server device in the mobile communication network to a communication terminal (for example, a mobile phone or a smartphone) used by the driver of the vehicle. Accordingly, even with the warning unit 30 not provided, a warning can be communicated to the driver of the vehicle by the mobile phone or the smart phone.

The invention claimed is:
1. A tire failure prediction system, comprising;
first and second temperature sensors configured to detect a temperature value of each of a first tire and a second tire that are mounted on a traveling vehicle;

a temperature acquisition unit configured to acquire the temperature values respectively detected by the first and second temperature sensors;

a determination unit configured to make a determination, based on the temperature values acquired by the temperature acquisition unit, of a possibility of failure of the first and second tires, the vehicle comprising axles on which the tires are mounted, the first tire and the second tire being mounted on an identical axle of the vehicle, a mounting position of the first tire and a mounting position of the second tire being symmetrical positions on the identical axle, and the determination unit making a determination that the first tire has a possibility of failure in a case where the temperature value of the first tire acquired by the temperature acquisition unit is greater than a predetermined threshold value, and a temperature difference corresponding to a difference between the temperature value of the first tire and the temperature value of the second tire acquired by the temperature acquisition unit is greater than a predetermined first temperature threshold value;

first and second air pressure sensors configured to detect air pressure values of inner portions of the first tire and the second tire, the first tire and the second tire being pneumatic tires; and an air pressure acquisition unit acquiring the air pressure values respectively detected by the first and second air pressure sensors, wherein the determination unit makes the determination by using a second temperature threshold value that is higher than the first temperature threshold value in a case where an air pressure difference corresponding to a difference between the air pressure value of the first tire and the air pressure value of the second tire acquired by the air pressure acquisition unit is greater than a predetermined threshold value.

2. The tire failure prediction system according to claim 1, wherein the air pressure value of the first tire is a first temperature-converted air pressure value acquired by converting a detection value of the first air pressure sensor based on a predetermined temperature, and the air pressure value of the second tire is a second temperature-converted air pressure value acquired by converting a detection value of the second air pressure sensor based on the predetermined temperature, and the determination unit makes the determination by using a second temperature threshold value that is higher than the first temperature threshold value in a case where an air pressure difference corresponding to a difference between the first temperature-converted air pressure value and the second temperature-converted air pressure value is greater than a predetermined threshold value.

3. The tire failure prediction system according to claim 1, wherein the determination unit determines that the first tire has a possibility of failure in a case where a temperature difference corresponding to a difference between the temperature value of the first tire and the temperature value of the second tire acquired by the temperature acquisition unit is greater than the second temperature threshold value, and the determination unit does not determine that the first tire has a possibility of failure in a case where the temperature difference is not greater than the second temperature threshold value.

4. The tire failure prediction system according to claim 1, further comprising:

a temperature difference average value calculating unit configured to calculate a temperature difference average value between the temperature value detected by the first temperature sensor and the temperature value detected by the second temperature sensor, wherein the determination unit further determines that the first tire has a possibility of failure in a case where an absolute value of a difference between the temperature difference average value and the temperature difference is greater than a predetermined third temperature threshold value, and the determination unit does not determine that the first tire has a possibility of failure in a case where the absolute value of the difference between the temperature difference average value and the temperature difference is not greater than the third temperature threshold value.

5. The tire failure prediction system according to claim 1, further comprising:

an ambient temperature sensor configured to detect an ambient temperature of an external portion of the vehicle; and a temperature correction unit configured to correct a temperature value acquired by the temperature acquisition unit based on the ambient temperature detected by the ambient temperature sensor, wherein the determination unit makes the determination based on a temperature value corrected by the temperature correction unit.

6. The tire failure prediction system according to claim 1, further comprising:

a temperature change rate calculating unit configured to calculate a temperature change rate of the temperature value detected by the first temperature sensor and a temperature change rate of the temperature value detected by the second temperature sensor, wherein the determination unit makes the determination in a case where the temperature change rate of the temperature value detected by the first temperature sensor is greater than a predetermined change rate threshold value, and a ratio between the temperature change rate of the temperature value detected by the first temperature sensor and the temperature change rate of the temperature value detected by the second temperature sensor is greater than a predetermined change rate ratio threshold value.

7. The tire failure prediction system according to claim 6, further comprising:

a temperature change rate ratio average value calculating unit configured to calculate an average value of a temperature change rate ratio corresponding to the ratio between the temperature change rate of the temperature value detected by the first temperature sensor and the temperature change rate of the temperature value detected by the second temperature sensor, wherein the determination unit further determines that the first tire has a possibility of failure in a case where a value of the temperature change rate ratio with respect to the average value calculated by the average value calculating unit is greater than a predetermined threshold value.

8. The tire failure prediction system according to claim 1, further comprising:
a normal-time temperature difference calculating unit configured to calculate a temperature difference between the first tire and the second tire during normal time, wherein
the determination unit further determines that the first tire has a possibility of failure in a case where a difference between a temperature difference between the first tire and the second tire and the temperature difference during normal time is greater than a predetermined threshold value.

9. The tire failure prediction system according to claim 1, further comprising:
a normal-time temperature change rate calculating unit calculating a temperature change rate ratio between the first tire and the second tire during normal time, wherein
the determination unit further determines that the first tire has a possibility of failure in a case where the value of the temperature change rate ratio during normal time with respect to a maximum value of the temperature change rate ratio during normal time is greater than a predetermined threshold value.

10. The tire failure prediction system according to claim 1, wherein
the temperature acquisition unit acquires the temperature value at a predetermined period length, and
the temperature acquisition unit acquires the temperature value of the first tire at a period length smaller than the predetermined period length in a case where the temperature value of the first tire acquired by the temperature acquisition unit is greater than a predetermined threshold value, and a difference between the temperature of the first tire and the temperature of the second tire is greater than a predetermined threshold value.

11. The tire failure prediction system according to claim 1, further comprising:
a warning unit configured to output a warning related to a tire based on a determination result from the determination unit.

12. A tire failure prediction method, comprising the steps of:
acquiring temperature values of a first tire and a second tire mounted at symmetrical positions on an identical axle of a traveling vehicle, the temperature values being respectively detected by first and second temperature sensors,
determining that the first tire has a possibility of failure in a case where the temperature value of the first tire is greater than a predetermined threshold value, and a temperature difference corresponding to a difference between the temperature value of the first tire and the temperature value of the second tire is greater than a predetermined first temperature threshold value,
detecting air pressure values of inner portions of the first tire and the second tire, the first tire and the second tire being pneumatic tires, and
acquiring the air pressure values respectively detected by the first and second air pressure sensors, wherein
the determining uses a second temperature threshold value that is higher than the first temperature threshold value in a case where an air pressure difference corresponding to a difference between the air pressure value of the first tire and the air pressure value of the second tire is greater than a predetermined threshold value.

13. A tire failure prediction method, comprising the steps of:
acquiring temperature values of a first tire and a second tire mounted at symmetrical positions on an identical axle of a traveling vehicle, the temperature values being respectively detected by first and second temperature sensors, and
determining that the first tire has a possibility of failure in a case where the temperature value of the first tire is greater than a predetermined threshold value, and a temperature difference corresponding to a difference between the temperature value of the first tire and the temperature value of the second tire is greater than a predetermined first temperature threshold value; wherein
the temperature values are acquired at a predetermined period length,
the temperature value of the first tire is acquired at a period length smaller than the predetermined period length in a case where the temperature value of the first tire acquired is greater than a predetermined threshold value, and a difference between the temperature of the first tire and the temperature of the second tire is greater than a predetermined threshold value.

14. A tire failure prediction system, comprising;
first and second temperature sensors configured to detect a temperature value of each of a first tire and a second tire that are mounted on a traveling vehicle;
a temperature acquisition unit configured to acquire the temperature values respectively detected by the first and second temperature sensors; and
a determination unit configured to make a determination, based on the temperature values acquired by the temperature acquisition unit, of a possibility of failure of the first and second tires,
the vehicle comprising axles on which the tires are mounted,
the first tire and the second tire being mounted on an identical axle of the vehicle,
a mounting position of the first tire and a mounting position of the second tire being symmetrical positions on the identical axle, and
the determination unit making a determination that the first tire has a possibility of failure in a case where the temperature value of the first tire acquired by the temperature acquisition unit is greater than a predetermined threshold value, and a temperature difference corresponding to a difference between the temperature value of the first tire and the temperature value of the second tire acquired by the temperature acquisition unit is greater than a predetermined first temperature threshold value; wherein
the temperature acquisition unit acquires the temperature value at a predetermined period length, and
the temperature acquisition unit acquires the temperature value of the first tire at a period length smaller than the predetermined period length in a case where the temperature value of the first tire acquired by the temperature acquisition unit is greater than a predetermined threshold value, and a difference between the temperature of the first tire and the temperature of the second tire is greater than a predetermined threshold value.

* * * * *